United States Patent
Kawashima et al.

(10) Patent No.: US 10,734,858 B2
(45) Date of Patent: Aug. 4, 2020

(54) ELECTRIC MOTOR

(71) Applicant: Mitsuba Corporation, Gunma (JP)

(72) Inventors: Yoshichika Kawashima, Kiryu (JP); Teppei Tokizaki, Kiryu (JP); Natsumi Tamura, Kiryu (JP)

(73) Assignee: Mitsuba Corporation, Gunma (JP)

(*) Notice: Subject to any disclaimer, the term of this patent is extended or adjusted under 35 U.S.C. 154(b) by 203 days.

(21) Appl. No.: 15/946,827

(22) Filed: Apr. 6, 2018

(65) Prior Publication Data
US 2018/0226853 A1 Aug. 9, 2018

Related U.S. Application Data

(63) Continuation of application No. 14/422,456, filed as application No. PCT/JP2013/072539 on Aug. 23, 2013, now abandoned.

(30) Foreign Application Priority Data

Aug. 30, 2012 (JP) .................................. 2012-189993
Dec. 18, 2012 (JP) .................................. 2012-276265

(51) Int. Cl.
H02K 3/28 (2006.01)
H02K 23/30 (2006.01)
(Continued)

(52) U.S. Cl.
CPC .............. *H02K 3/28* (2013.01); *H02K 3/522* (2013.01); *H02K 3/527* (2013.01); *H02K 13/04* (2013.01); *H02K 23/30* (2013.01)

(58) Field of Classification Search
CPC .......... H02K 3/28; H02K 3/522; H02K 3/527; H02K 13/04; H02K 13/10; H02K 23/30; H02K 23/38; H02K 5/148
(Continued)

(56) References Cited

U.S. PATENT DOCUMENTS

| | | | |
|---|---|---|---|
| 6,043,581 A | 3/2000 | Tanaka et al. | |
| 2007/0188040 A1* | 8/2007 | Kawashima | H02K 23/20 310/225 |
| 2010/0264773 A1* | 10/2010 | Hino | H02K 3/34 310/198 |

FOREIGN PATENT DOCUMENTS

| | | |
|---|---|---|
| JP | 60111353 A | 7/1985 |
| JP | 03011963 A | 1/1991 |

(Continued)

OTHER PUBLICATIONS

Shioda Naoki; Kawashima Yoshichika; Shiga Masatake, Three-Phase DC Motor, Jan. 28, 2010, Mitsuba Corporation, WO 2010010906 (English Machine Translation) (Year: 2010).*

(Continued)

*Primary Examiner* — Alfonso Perez Borroto
*Assistant Examiner* — Alexander A Singh
(74) *Attorney, Agent, or Firm* — Wood Herron & Evans LLP

(57) ABSTRACT

When teeth (12) are allocated in a circumferential direction in sequence of a U phase, a V phase and a W phase, a forward wound coil wound on each of the phases is provided as a coil of the U phase, the V phase and the W phase, and a reverse wound coil wound on each of the phases is provided as the coil of a –U phase, a –V phase and a –W phase, the coils are electrically connected between the neighboring segments in an order of the U phase, the –W phase, the –W phase, the V phase, the –U phase, the –U phase, the W phase, the –V phase and the –V phase, and the wire (14) drawn between the armature core (8) and the commutator (10) is drawn around the rotation shaft in the same direction.

18 Claims, 24 Drawing Sheets

(51) Int. Cl.
*H02K 3/52* (2006.01)
*H02K 13/04* (2006.01)

(58) Field of Classification Search
USPC .................................. 310/194, 214, 215, 71
See application file for complete search history.

(56) References Cited

FOREIGN PATENT DOCUMENTS

| | | | |
|---|---|---|---|
| JP | 0932284 A | 12/1997 |
| JP | 11027886 A | 1/1999 |
| JP | 2003088028 A | 3/2003 |
| JP | 2004242368 A | 8/2004 |
| JP | 2004312795 A | 11/2004 |
| JP | 2005333752 A | 12/2005 |
| JP | 2007228754 A | 9/2007 |
| JP | 2008113485 A | 5/2008 |
| JP | 2008211921 A | 9/2008 |
| JP | 2010124636 A | 6/2010 |
| JP | 2010226847 A | 10/2010 |
| JP | 2010259140 A | 11/2010 |
| JP | 2011130640 A | 6/2011 |
| JP | 2011166896 A | 8/2011 |
| JP | 2011244564 A | 12/2011 |
| JP | 2012100447 A | 5/2012 |
| WO | 2010010906 A1 | 1/2010 |
| WO | WO-2010010906 A1 * | 1/2010 | ............ H02K 23/30 |

OTHER PUBLICATIONS

Japanese Patent Office, Office Action issued in Japanese Patent Application No. 2012-276265 dated May 24, 2016, 6 pages.
Japanese Patent Office, Office Action issued in Japense Patent Application No. 2012-189993 dated Sep. 27, 2016, 6 pages.
Japanese Patent Office, Office Action issued in Japanese Patent Application No. 2012-276265 dated Dec. 20, 2016, 6 pages.
European Patent Office, Search Report issued in European Patent Application No. 16206901.7 dated Feb. 16, 2017, 7 pages.
Japanese Patent Office, International Search Report issued in corresponding International Patent Application No. PCT/JP2013/072539 dated Nov. 19, 2013, 4 pages.

* cited by examiner

ELECTRIC MOTOR

TECHNICAL FIELD

The present invention relates to, for example, an electric motor mounted in a vehicle.

Priority is claimed on Japanese Patent Application No. 2012-189993, filed Aug. 30, 2012, and Japanese Patent Application No. 2012-276265, filed Dec. 18, 2012, the contents of which are incorporated herein by reference.

BACKGROUND ART

For example, as a wiper motor for an automobile, a 3-brush type motor capable of changing a rotation speed is used. In such a motor, an armature on which an armature coil is wound is rotatably disposed inside a cylindrical yoke including a plurality of magnetic poles formed at an inner circumferential surface thereof. The armature has the armature core fitted and fixed onto a rotation shaft, and a slot elongated in an axial direction is formed in the armature core. In the slot, a wire is wound through a distributed winding method at predetermined intervals to form a plurality of coils. Each of the coils is electrically connected to a segment of a commutator attached to a rotation shaft.

Each of the segments can come in contact with the brushes. The brushes are configured of three brushes, i.e., a low speed brush, a high speed brush, and a common brush commonly used for these brushes. The high speed brush is disposed to be angularly advanced more than the low speed brush. Then, power is supplied by the common brush and the low speed brush during normal operation, and supplied by the common brush and the high speed brush during high speed operation. According to the above-mentioned configuration, the 3-brush type motor can set a difference in the numbers of effective conductors between during normal operation and high speed operation. That is, in high speed operation, the motor is more angularly advanced than in normal operation, and is operated at a higher revolution speed than in normal operation.

Here, a motor such as a wiper motor or the like mounted in a vehicle normally requires miniaturization due to requirements of improvement of vehicle mountability or the like. For this reason, for example, a motor in which the number of slots of the armature core is set to 16 and the number of magnetic poles is set to 4 is disclosed. In the motor, a coil is wound to straddle over four teeth according to the number of magnetic poles through a distributed winding method. Then, the coil is connected to a commutator having sixteen segments in which the same electric potentials are short-circuited (for example, see Patent Literature 1).

CITATION LIST

Patent Literature

[Patent Literature 1] Japanese Unexamined Patent Application, First Publication No. 2010-226847

SUMMARY OF INVENTION

Technical Problem

Here, in order to obtain a large output, in many cases, the motor of the related art mentioned above is connected to a speed reducer (a speed reduction unit) when used. Here, an increase in a speed reduction ratio of the speed reducer is considered as a means for miniaturizing the motor. As the speed reduction ratio is increased, the output of the motor itself can be suppressed, and as a result, the motor can be reduced in size.

Here, while the number of revolutions of the motor should be increased to an extent of the increase in speed reduction ratio, when the number of slots is large, an order determined by the least common multiple between the number of magnetic poles and the number of slots is increased.

For this reason, noise from the motor reaches a high frequency, and the noise may become dissonant.

In addition, since the shape of the armature core is complicated as the number of slots is increased, productivity of the armature may deteriorate.

Further, since the number of segments per pole pair is reduced, the voltage between the segments is increased, and rectification deteriorates.

Then, since the coil is wound on the teeth through the distributed winding method, overlapping of coil ends increases, a wire rod cost of the coil increases, motor performance decreases, and the electric motor increases in size.

Here, in consideration of the above-mentioned circumstances, the present invention provides an electric motor capable of preventing generation of high frequency noise, increasing productivity of an armature, and further improving rectification. In addition, the present invention also provides an electric motor capable of improving motor performance while reducing production cost, and capable of being miniaturized.

Solution to Problem

According to a first aspect of the present invention, an electric motor includes: a yoke having a plurality of magnetic poles; a rotation shaft rotatably installed inside the yoke; an armature core having a plurality of teeth attached to the rotation shaft and radially extending in a radial direction, and a plurality of slots formed between the teeth; a coil wound on each of the teeth through an concentrated winding method; a commutator installed at the rotation shaft adjacent to the armature core and having a plurality of segments disposed in a circumferential direction; and three brushes including a low speed brush and a high speed brush configured to supply power to the coil via the segments, and a common brush used in common with the low speed brush and the high speed brush, wherein the number of magnetic poles is set to 4, the number of slots is set to 6, and the number of segments is set to 18, the coil wound on each of the teeth comprises one forward wound coil formed to be wound forward, and two reverse wound coils formed to be wound in reverse, when the teeth are allocated in the circumferential direction in sequence of a U phase, a V phase and a W phase, the forward wound coil wound on each of the phases is provided as the coil of the U phase, the V phase and the W phase, and the reverse wound coil wound on each of the phases is provided as the coil of a –U phase, a –V phase and a –W phase, the coils are electrically connected between the neighboring segments in the order of the U phase, the –W phase, the –W phase, the V phase, the –U phase, the –U phase, the W phase, the –V phase and the –V phase, and the coil drawn between the armature core and the commutator is drawn around the rotation shaft in the same direction.

In addition, according to a second aspect of the present invention, an electric motor includes: a yoke having a plurality of magnetic poles; a rotation shaft rotatably installed inside the yoke; an armature core having a plurality of teeth attached to the rotation shaft and radially extending in a radial direction, and a plurality of slots formed between the teeth; a coil wound on each of the teeth through an concentrated winding method; a commutator installed at the rotation shaft adjacent to the armature core and having a plurality of segments disposed in a circumferential direction; and two brushes configured to supply power to the coil via the segments, wherein the number of magnetic poles is set to 4, the number of slots is set to 6, and the number of segments is set to 18, the coil wound on each of the teeth comprises one forward wound coil formed to be wound forward, and two reverse wound coils formed to be wound in reverse, when the teeth are allocated in the circumferential direction in sequence of a U phase, a V phase and a W phase, the forward wound coil wound on each of the phases is provided as the coil of the U phase, the V phase and the W phase, and the reverse wound coil wound on each of the phases is provided as the coil of a −U phase, a −V phase and a −W phase, the coils are electrically connected between the neighboring segments in the order of the U phase, the −W phase, the −W phase, the V phase, the −U phase, the −U phase, the W phase, the −V phase and the −V phase, and the coil drawn between the armature core and the commutator is drawn around the rotation shaft in the same direction.

According to the above-mentioned configuration, since the number of slots can be reduced without motor performance deteriorating, an order of the motor can be reduced. For this reason, high frequency noise can be prevented upon high speed rotation of the motor.

In addition, as the number of slots is reduced, the shape of the armature core can be simplified and productivity of the armature can be increased by the number of the slots reduced. Further, the size of each of the slots can be set to increase as the number of slots is reduced. For this reason, the number of times that the coil is wound on the teeth can be set to be high. As a result, the armature core can be reduced in size and weight.

Then, as the number of segments is set to three times or more the number of slots, the number of segments per pole pair can be increased. For this reason, a voltage between the segments can be reduced, and rectification can be improved. In addition, since the number of effective conductors of the coil per segment is reduced, speed variation by the high speed brush becomes easy.

In addition, since the coil is wound on the teeth through the concentrated winding method, a space factor of the coil can be improved and overlapping of coil ends can be reduced in comparison with the case in which the coil is wound through the distributed winding method. For this reason, a wire rod cost of the coil can be reduced, and an inexpensive electric motor can be provided. Further, the armature core can be reduced in size and axial length while having the same motor performance.

In addition, since the coil drawn between the armature core and the commutator is drawn around the rotation shaft in the same direction, an operation direction of the winding apparatus for drawing the coil can become constant. For this reason, a load to the winding apparatus can be reduced, workability of winding the coil can be improved, irregularity of tension applied to the coil is prevented, and further, the space factor can be improved. Accordingly, the motor performance can be improved while reducing the production cost.

The electric motor according to the present invention, in the segments, the segments having the same electric potential are connected to each other by a connecting wire, when the coils of the U phase, the −W phase, the −W phase, the V phase, the −U phase, the −U phase, the W phase, the −V phase and the −V phase are formed, the connecting wire is formed in series along with the coils of the U phase, the −W phase, the −W phase, the V phase, the −U phase, the −U phase, the W phase, the −V phase and the −V phase, when the connecting wire is formed, the coil is drawn in the same direction as when it is drawn between the armature core and the commutator, and the coil is wound around a riser formed at the segment by an a turn to connect the segment and the coil.

According to the above-mentioned configuration, a connection error between the segment and the coil can be securely prevented. In addition, since stretching of the coil under a head of the commutator can be securely suppressed, contact between the coils wound around the neighboring risers can be suppressed. For this reason, generation of heat can be suppressed, and an operation error of the electric motor caused by exfoliation of a coating of the coil and the contact between the coils wound around the neighboring risers can be prevented.

Advantageous Effects of Invention

According to the above-mentioned electric motor, since the number of slots can be reduced without motor performance deteriorating, an order of the motor can be reduced. For this reason, generation of high frequency noise during the high speed rotation of the motor can be prevented.

In addition, as the number of slots is reduced, the shape of the armature core can be simplified by the number of the slots reduced, and productivity of the armature can be increased. Further, as the number of slots is reduced, the size of each slot can be set to a large size. For this reason, the number of turns of the coil on each of the teeth can be set to a large value. As a result, the armature core can be reduced in size and weight.

Then, as the number of segments is set to three times or more the number of slots, the number of segments per pole pair can be increased. For this reason, the voltage between the segments can be reduced, and the rectification can be improved. In addition, since the number of effective conductors of the coil per segment is reduced, it is possible to easily deal with speed variation by the high speed brush.

In addition, since the coil is wound on the teeth through the concentrated winding method, a space factor of the coil can be improved and overlapping of the coil end can be reduced in comparison with the case in which the coil is wound through the distributed winding method. For this reason, a wire rod cost of the coil can be reduced, and an inexpensive electric motor can be provided. Further, the armature core can be reduced in size and axial length while having the same motor performance.

In addition, since the coil is drawn between the armature core and the commutator and drawn around the rotation shaft in the same direction, an operation direction of the winding apparatus for drawing the coil can become constant. For this reason, a load to the winding apparatus can be reduced, workability of winding the coil can be improved, irregularity of tension applied to the coil is prevented, and further, the space factor can be improved. Accordingly, motor performance can be improved while reducing a production cost.

DESCRIPTION OF EMBODIMENTS

First Embodiment (Reduction Motor)

Next, a first embodiment of the present invention will be described based on FIGS. 1 to 6.

Figure 1:
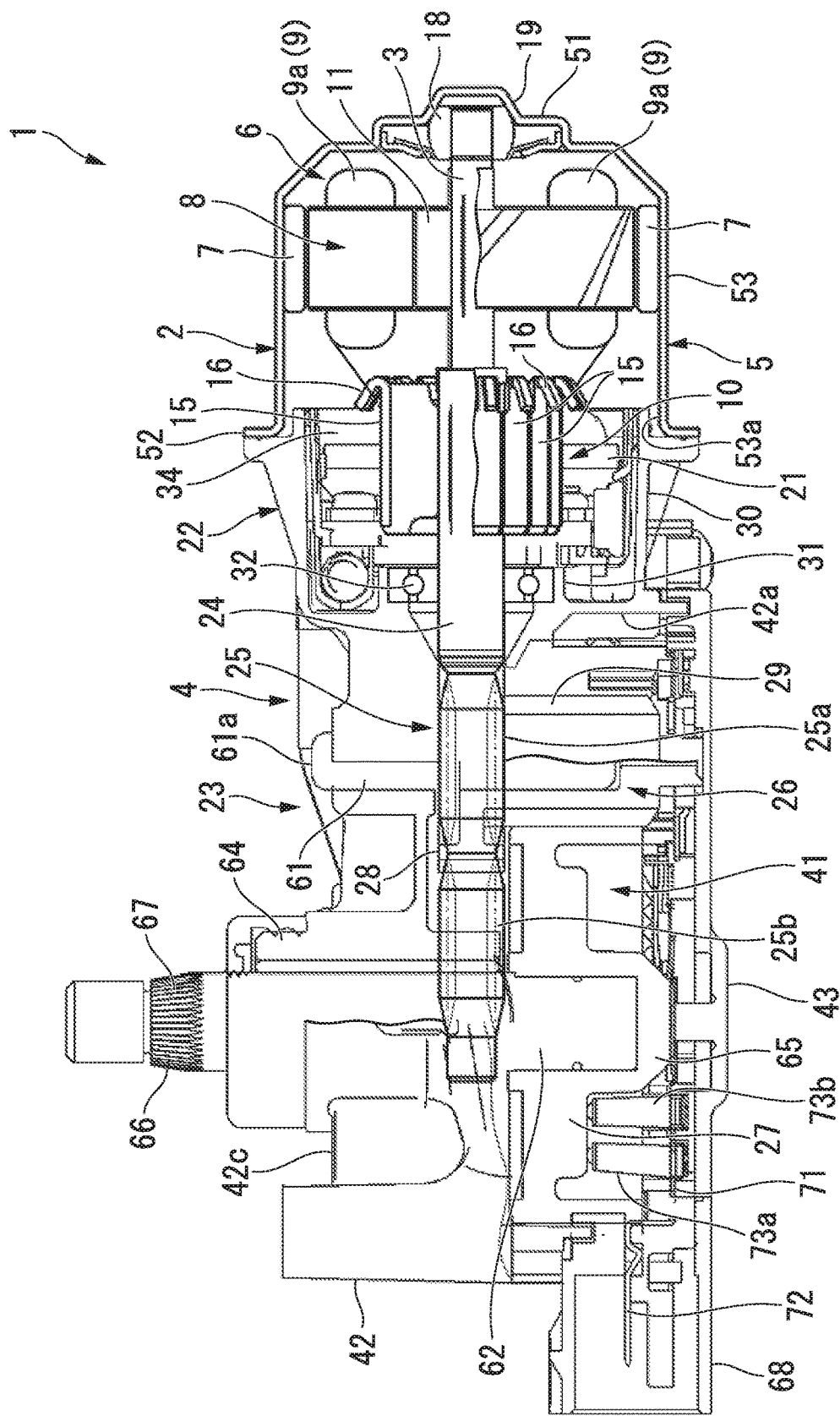
FIG. 1 is a longitudinal cross-sectional view of a reduction motor according to an embodiment of the present invention.
Figure 2:
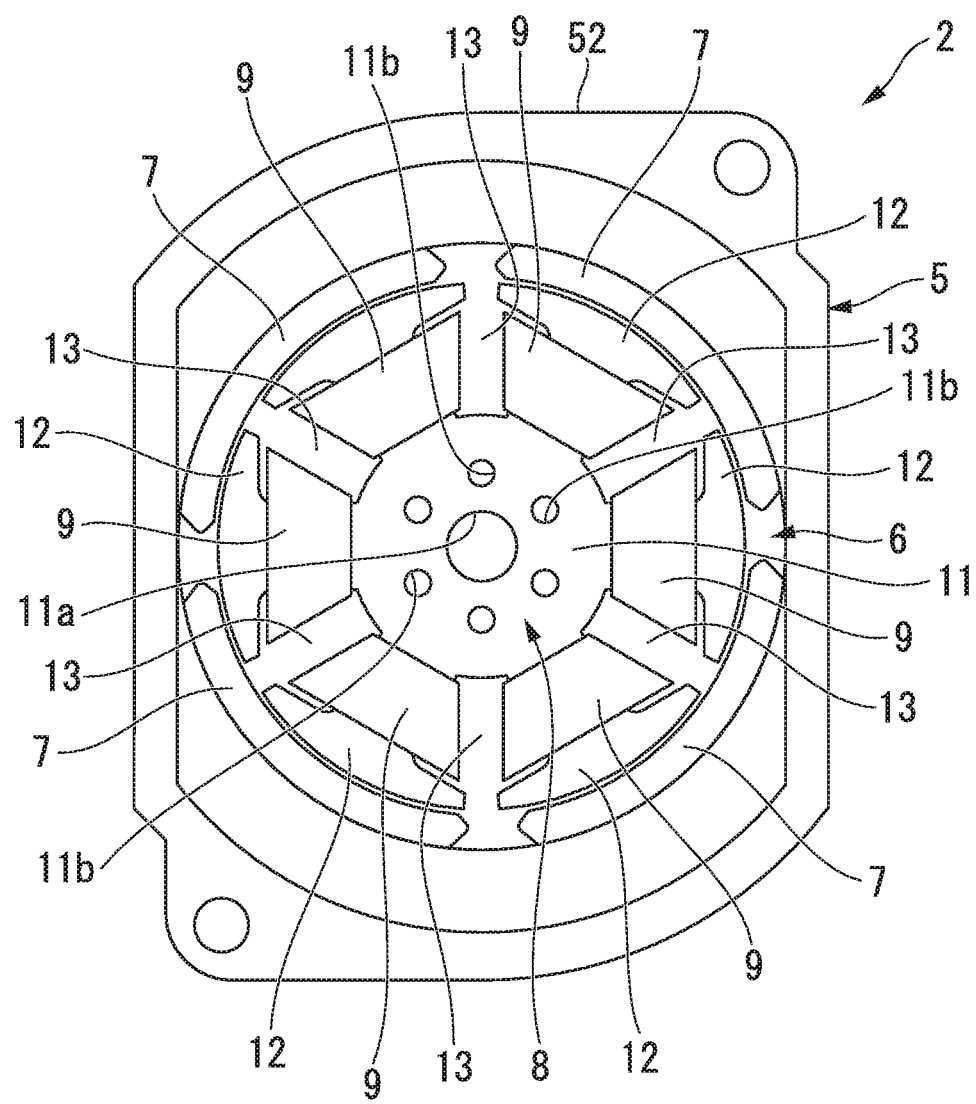
FIG. 2 is a plan view of an electric motor according to the embodiment of the present invention when seen in an axial direction.

FIG. 1 is a longitudinal cross-sectional view of a reduction motor to which an electric motor according to an embodiment of the present invention is applied, and FIG. 2 is a plan view of the electric motor when seen in an axial direction.

As shown in FIGS. 1 and 2, a reduction motor 1 includes an electric motor 2, and a speed reduction mechanism 4 connected to a rotation shaft 3 of the electric motor 2. The electric motor 2 has a bottomed cylindrical yoke 5, and an armature 6 rotatably installed in the yoke 5.

A cylindrical portion 53 of the yoke 5 is formed in a substantially cylindrical shape, and four segment-type permanent magnets 7 are disposed at an inner circumferential surface of the cylindrical portion 53.

A bearing housing 19 protruding outward in an axial direction is formed at a center in a radial direction of a bottom wall (an end portion) 51 of the yoke 5, and a sliding bearing 18 configured to rotatably and axially support one end of the rotation shaft 3 is installed at the bottom wall 51. The sliding bearing 18 has a centering function of the rotation shaft 3.

An outer flange portion 52 is formed at an opening portion 53a of the cylindrical portion 53. A bolt hole (not shown) is formed at the outer flange portion 52. The yoke 5 is fastened and fixed to the speed reduction mechanism 4 by inserting a bolt (not shown) through the bolt hole and by screwing the bolt into a bolt hole (not shown) formed in a gear housing 23 (to be described below) of the speed reduction mechanism 4.

The armature 6 includes an armature core 8 fixedly fitted onto the rotation shaft 3, an armature coil 9 wound on the armature core 8, and a commutator 10 disposed at the other end side of the rotation shaft 3. The armature core 8 is formed by stacking plate members formed of a magnetic material and punched through pressing in the axial direction (a stacked core) or pressure-forming a soft magnetic powder (a pressed powder core), and has a substantially columnar core main body 11.

A through-hole 11a through which the rotation shaft 3 is press-fitted is formed in substantially the center in the radial direction of the core main body 11. In addition, six teeth 12 each having substantially a T shape when seen from a plan view in the axial direction are formed radially at an outer circumferential portion of the core main body 11. As the teeth 12 are radially installed at the outer circumferential portion of the core main body 11, six slots 13 having dovetail grooves are formed between the neighboring teeth 12.

The armature coil 9 is wound on the armature core 8 via the slots 13.

Here, six holes 11b having circular cross sections and penetrating in the axial direction are formed in the core main body 11 in the circumferential direction at positions corresponding to roots of the teeth 12. More specifically, the holes 11b are formed between the through-hole 11a of the core main body 11 and the teeth 12 at positions slightly closer to the through-hole 11a from a substantially center between the through-hole 11a and the roots of the teeth 12 in the radial direction. The holes 11b are configured to promote convection of air in the electric motor 2 and suppress an increase in temperature of the electric motor 2.

The commutator 10 is fixedly fitted onto the other end side of the rotation shaft 3 closer than the armature core 8. Eighteen segments 15 formed of a conductive material are attached to an outer circumferential surface of the commutator 10. The segments 15 are formed of plate-shaped metal pieces elongated in the axial direction, and are insulated from each other and fixed in parallel at equal intervals in the circumferential direction.

In this way, the electric motor 2 is a four-pole six-slot eighteen-segment electric motor in which the number of permanent magnets 7 is set to 4 (the number of magnetic poles is 4), the number of slots 13 is set to 6, and the number of segments 15 is set to 18.

In addition, a riser 16 bent in a shape that returns to an outer diameter side is integrally formed with an end portion of the armature core 8 side of each of the segments 15. A terminal portion of the armature coil 9 is wound around and fixed to the riser 16 through fusing or the like. Accordingly, the segments 15 and the armature coils 9 corresponding thereto are electrically connected to each other.

In addition, a connecting wire 17 (see FIG. 4) is wound around the risers 16 corresponding to the segments 15 having the same electric potential, and the connecting wire 17 is fixed to the riser 16 through fusing. The connecting wire 17 short-circuits the segments 15 having the same electric potential, and is drawn between the commutator 10 and the armature core 8 (to be described in detail below).

The commutator 10 having the above-mentioned configuration faces the gear housing 23 of the speed reduction mechanism 4. The gear housing 23 is configured of a housing main body 42 formed in substantially a box shape having an opening portion 42a at one surface thereof through an aluminum die-casting method and configured to receive a gear group 41 of the speed reduction mechanism 4, and a bottom plate 43 formed of a resin and configured to close the opening portion 42a of the housing main body 42. A brush-receiving portion 22 is integrally formed with the housing main body 42 near the electric motor 2, and the commutator 10 of the electric motor 2 faces the brush-receiving portion 22.

(Brush-Receiving Portion)

Figure 3:
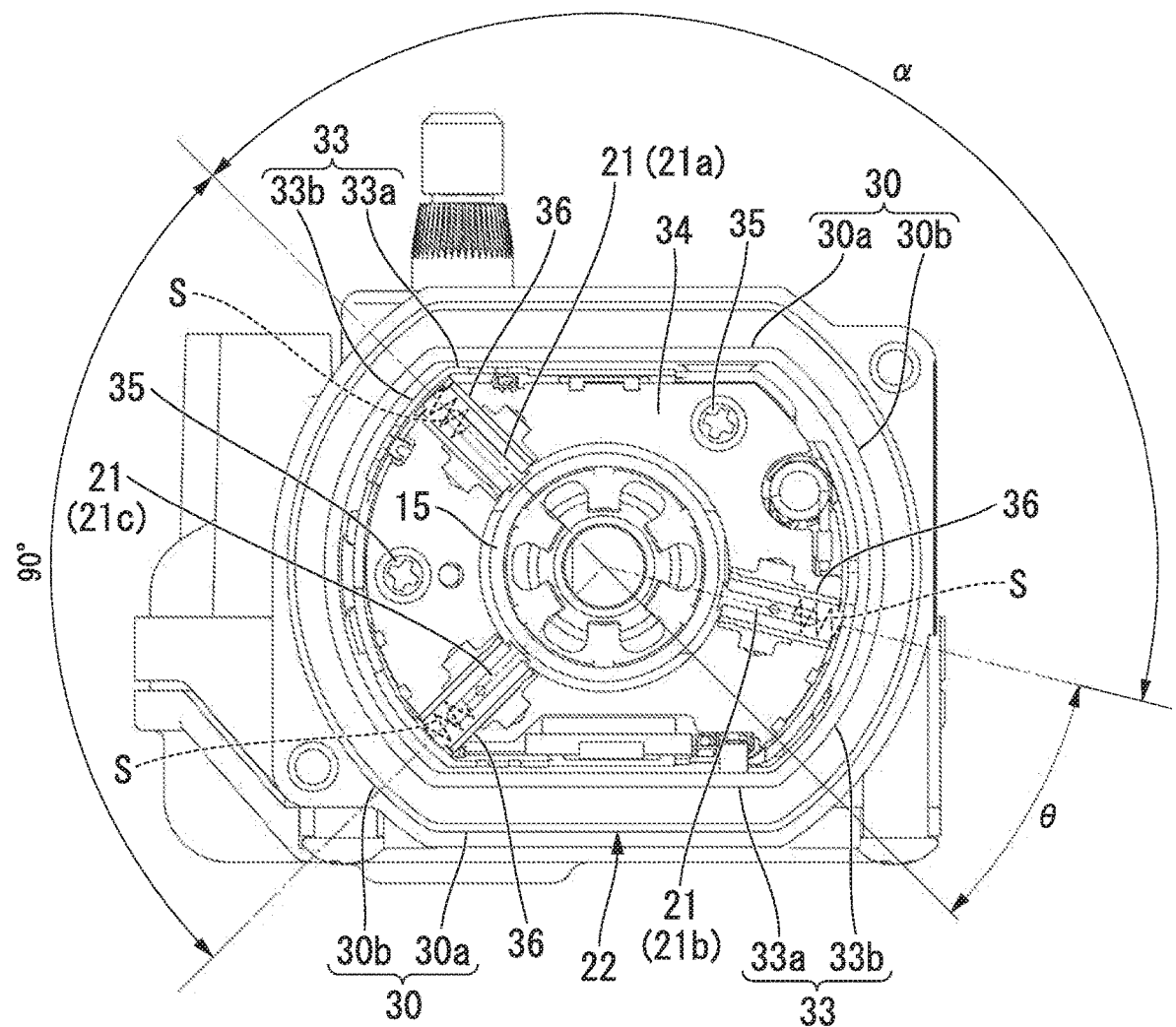
FIG. 3 is a plan view of a brush-receiving portion according to the embodiment of the present invention.

FIG. 3 is a plan view of the brush-receiving portion 22.

As shown in FIG. 3, the brush-receiving portion 22 is formed in a concave shape at the gear housing 23 near the electric motor 2. A circumferential wall 30 of the brush-receiving portion 22 is formed in a substantially oval shape, and configured of a planar wall 30a and an arc wall 30b.

A cover 33 is formed inside the brush-receiving portion 22 formed in a cylindrical shape having a substantially oval cross section to correspond thereto. The cover 33 also has a planar wall 33a and an arc wall 33b. Further, a holder stay 34 formed to correspond to the cover 33 is installed inside the cover 33. The holder stay 34 is fastened and fixed to a sidewall 42b of the housing main body 42 by a bolt 35.

Three brush holders 36 are installed at the holder stay 34 in the circumferential direction. Brushes 21 are installed in the brush holders 36 to protrude from and withdraw into the brush holders 36 in a state that each of the brushes 21 are biased via each of springs S. Front end portions of the brushes 21 are biased by the springs S and thus come in sliding contact with the segments 15 of the commutator 10. In addition, the brushes 21 are electrically connected to an external power supply (not shown), for example, a battery mounted in an automobile. Then, power can be supplied from the external power supply (not shown) to the commutator 10.

The brushes 21 are configured of a low speed brush 21a and a high speed brush 21b connected to a positive electrode side, and a common brush 21c used in common for the low speed brush 21a and the high speed brush 21b and connected to a negative electrode side. The low speed brush 21a and the common brush 21c are disposed at an electrical angle of 180°, i.e., at a mechanical angle of a 90° interval in the circumferential direction. The high speed brush 21b is disposed to be spaced an angle α from the low speed brush 21a in the circumferential direction. Further, in the embodiment, while the common brush 21c is described as being disposed at the negative electrode side, and the low speed brush 21a and the high speed brush 21b are described as being disposed at the positive electrode side, the positive electrode side and the negative electrode side may be reversed.

Here, since the segments 15 having the same electric potential of the commutator 10, i.e., the segments 15 opposite to each other with respect to the rotation shaft 3, are short-circuited by the connecting wire 17, power can also be supplied to the segments not in contact with the brush 21. Accordingly, the high speed brush 21b is present at a position angularly advanced from the low speed brush 21a by an angle θ.

(Wire Connecting Structure of Connecting Wire, and Winding Structure of Armature Coil)

Here, based on FIG. 4, a wire connecting structure of the connecting wire 17 and a winding structure of the armature coil 9 will be described in detail.

Figure 4:
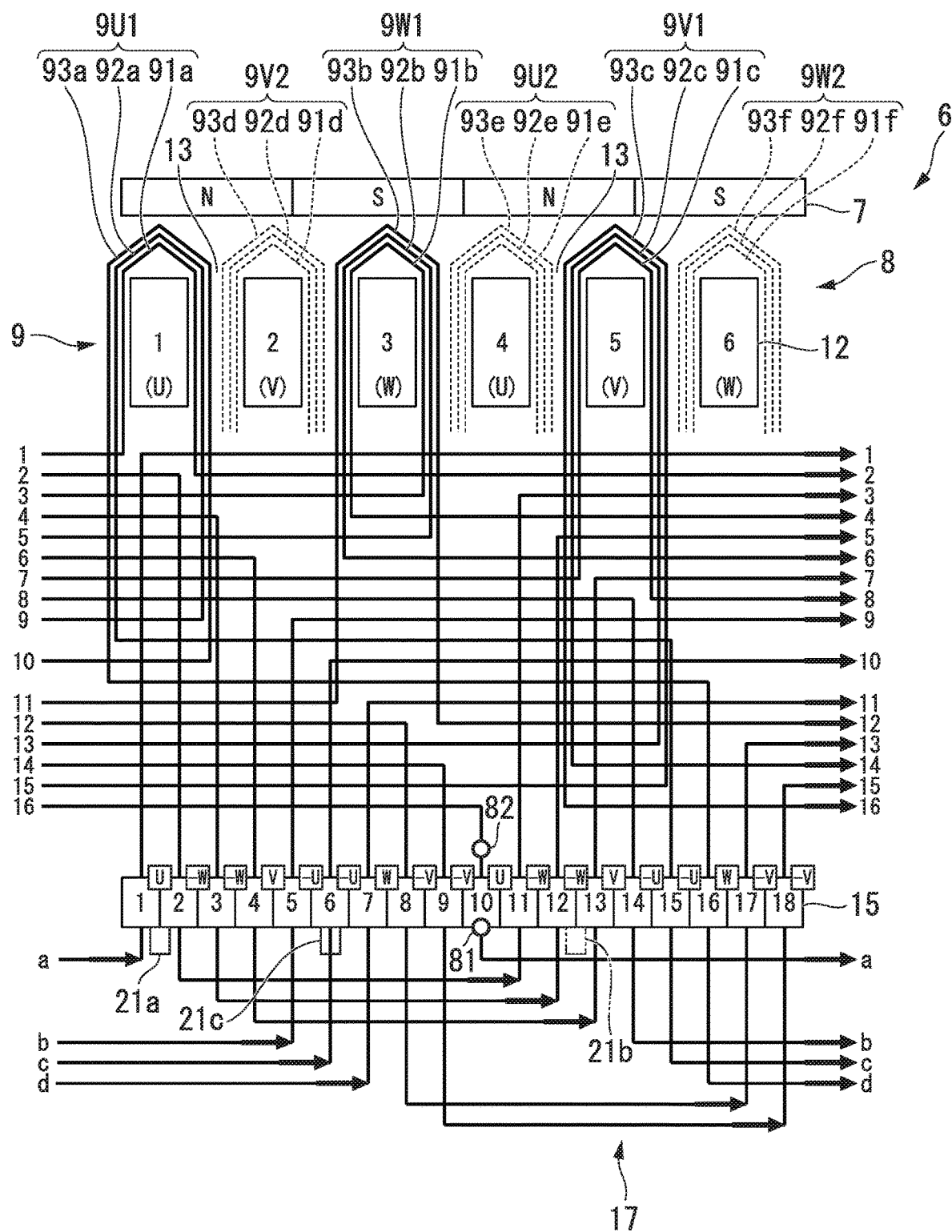
FIG. 4 is a development view of an armature according to a first embodiment of the present invention.

FIG. 4 is a development view of the armature 6, and a gap between the neighboring teeth 12 corresponds to the slot 13. Further, in description of FIG. 4, reference numerals are designated to the segments 15, the teeth 12 and the armature coils 9 wound thereon.

As shown in FIG. 4, the teeth 12 having a U phase, a V phase and a W phase are allocated in the circumferential direction in this order. That is, the first and fourth teeth 12 have the U phase, the second and fifth teeth 12 have the V phase, and the third and sixth teeth 12 have the W phase. In addition, the segments 15 having the same electric potential are short-circuited to each other by the connecting wire 17. Here, a position corresponding to the number designated to the segment 15 corresponding to No. 1 is a position corresponding to the first tooth 12.

Then, the armature coil 9 and the connecting wire 17 wound on the teeth 12 are formed by winding a wire 14 on the riser 16 of the armature core 8 or the commutator 10 through a double flyer method. Further, the double flyer method is a method of simultaneously winding the wire 14 about the rotation shaft 3 at two positions having a point-symmetrical relationship. Hereinafter, the method will be described in detail.

Here, there are two winding starting ends 81 of the wire 14, which are wound around the riser 16 of the first segment 15 and the riser 16 of the tenth segment 15 having the same electric potential. Then, a drawing direction of the wire 14 drawn between the armature core 8 and the commutator 10 is set to be same direction as the wire 14 drawn to form the connecting wire 17 around the rotation shaft 3.

Further, in the following description, a direction of sequentially allocating the U phase, the V phase and the W phase to the teeth 12, i.e., right in FIG. 4, is simply referred to as "right".

In addition, since a drawing sequence of the wire 14 initially wound from the first segment 15 and the wire 14 initially wound from the tenth segment 15 is point-symmetrical about the rotation shaft 3, in the following description, only the wire 14 initially wound from the tenth segment 15 will be described.

The wire 14 having the winding starting end 81 wound around the riser 16 of the tenth segment 15 is drawn to the right while being wound around the rotation shaft 3, and then wound around the first segment 15 having the same electric potential as the tenth segment 15. Then, when the wire 14 is drawn from the commutator 10 toward the armature core 8, the wire 14 is drawn to the right while being wound around the rotation shaft 3 and is pulled into the slot 13 between the first and sixth teeth 12. Next, when the wire 14 is wound on the teeth 12 N (N is a natural number of 1 or more) times, the wire 14 is wound forward on the first tooth 12 N/3 times to form a U phase coil 91*a*.

Next, the wire 14 is pulled out of the slot 13 between the first and second teeth 12, and the wire 14 is drawn to the right while being wound around the rotation shaft 3 and is wound around the riser 16 of the second segment 15 adjacent to the first segment 15. Next, the wire 14 is drawn to the right while being wound around the rotation shaft 3 and is wound around the riser 16 of the eleventh segment 15 having the same electric potential as the second segment 15. Once more, when the wire 14 is drawn from the commutator 10 toward the armature core 8, the wire 14 is drawn to the right while being wound around the rotation shaft 3 and is pulled into the slot 13 between the third and fourth teeth 12. Then, the wire 14 is wound in reverse on the third tooth 12 N/3 times to form a "−W phase" coil 91*b*.

Next, the wire 14 is pulled out of the slot 13 between the second and third teeth 12, and the wire 14 is drawn to the right while being wound around the rotation shaft 3 and is wound around the riser 16 of the third segment 15 adjacent to the second segment 15. Next, the wire 14 is drawn to the right while being wound around the rotation shaft 3 and is wound around the riser 16 of the twelfth segment 15 having the same electric potential as the third segment 15. Once again, when the wire 14 is drawn from the commutator 10 toward the armature core 8, the wire 14 is drawn to the right while being wound around the rotation shaft 3 and is pulled into the slot 13 between the third and fourth teeth 12. Then, the wire 14 is wound in reverse on the third tooth 12 N/3 times to form a "−W phase" coil 92*b*.

Next, the wire 14 is pulled out of the slot 13 between the second and third teeth 12, and the wire 14 is drawn to the right while being wound around the rotation shaft 3 and is wound around the riser 16 of the fourth segment 15 adjacent to the third segment 15. Next, the wire 14 is drawn to the right while being wound around the rotation shaft 3, and is wound around the riser 16 of the thirteenth segment 15 having the same electric potential as the fourth segment 15. Once more, when the wire 14 is drawn from the commutator 10 toward the armature core 8, the wire 14 is drawn to the right while being wound around the rotation shaft 3 and is pulled into the slot 13 between the fourth and fifth teeth 12.

Then, the wire 14 is wound forward on the fifth tooth 12 N/3 times to form a V phase coil 91*c*.

Next, the wire 14 is pulled out of the slot 13 between the fifth and sixth teeth 12, and the wire 14 is drawn to the right while being wound around the rotation shaft 3 and is wound around the riser 16 of the fourteenth segment 15 adjacent to the thirteenth segment 15. Next, the wire 14 is drawn to the right while being wound around the rotation shaft 3, and the wire 14 is wound around the riser 16 of the fifth segment 15 having the same electric potential as the fourteenth segment 15. Once more, when the wire 14 is drawn from the commutator 10 toward the armature core 8, the wire 14 is drawn to the right while being wound around the rotation shaft 3 and is pulled into the slot 13 between the first and second teeth 12. Then, the wire 14 is wound in reverse on the first tooth 12 N/3 times to form a "−U phase" coil 92*a*.

Next, the wire 14 is pulled out of the slot 13 between the first and sixth teeth 12, and the wire 14 is drawn to the right while being wound around the rotation shaft 3 and is wound around the riser 16 of the fifteenth segment 15 adjacent to the fourteenth segment 15. Next, the wire 14 is drawn to the right while being wound around the rotation shaft 3, and the wire 14 is wound around the riser 16 of the sixth segment 15 having the same electric potential as the fifteenth segment 15. Once more, when the wire 14 is drawn from the commutator 10 toward the armature core 8, the wire 14 is drawn to the right while being wound around the rotation shaft 3 and is pulled into the slot 13 between the first and second teeth 12. Then, the wire 14 is wound in reverse on the first tooth 12 N/3 times to form a "−U phase" coil 93*a*.

Next, the wire 14 is pulled out of the slot 13 between the first and sixth teeth 12, and the wire 14 is drawn to the right while being wound around the rotation shaft 3 and is wound around the riser 16 of the sixteenth segment 15 adjacent to the fifteenth segment 15. Next, the wire 14 is drawn to the right while being wound around the rotation shaft 3, and the wire 14 is wound around the riser 16 of the seventh segment 15 having the same electric potential as the sixteenth segment 15. Once more, when the wire 14 is drawn from the commutator 10 toward the armature core 8, the wire 14 is drawn to the right while being wound around the rotation shaft 3 and is pulled into the slot 13 between the second and third teeth 12. Then, the wire is wound forward on the third tooth 12 direction N/3 times to form a W phase coil 93*b*.

Next, the wire 14 is pulled out of the slot 13 between the third and fourth teeth 12, and the wire 14 is drawn to the right while being wound around the rotation shaft 3 and is wound around the riser 16 of the eighth segment 15 adjacent to the seventh segment 15. Next, the wire 14 is drawn to the right while being wound around the rotation shaft 3, and the wire 14 is wound around the riser 16 of the seventeenth segment 15 having the same electric potential as the eighth segment 15. Once more, when the wire 14 is drawn from the commutator 10 toward the armature core 8, the wire 14 is drawn to the right while being wound around the rotation shaft 3 and is pulled into the slot 13 between the fifth and sixth teeth 12. Then, the wire 14 is wound in reverse on the fifth tooth 12 N/3 times to form a "−V phase" coil 92*c*.

Next, the wire 14 is pulled out of the slot 13 between the fourth and fifth teeth 12, and the wire 14 is drawn to the right while being wound around the rotation shaft 3 and is wound around the riser 16 of the ninth segment 15 adjacent to the eighth segment 15. Next, the wire 14 is drawn to the right while being wound around the rotation shaft 3, and the wire 14 is wound around the riser 16 of the eighteenth segment 15 having the same electric potential as the ninth segment 15. Once more, when the wire 14 is drawn from the commutator 10 toward the armature core 8, the wire 14 is drawn to the right while being wound around the rotation shaft 3 and is pulled into the slot 13 between the fifth and sixth teeth 12. Then, the wire is wound in reverse on the fifth tooth 12 N/3 times to form a "−V phase" coil 93c.

After that, the wire 14 is pulled out of the slot 13 between the fourth and fifth teeth 12, the wire 14 is drawn to the right while being wound around the rotation shaft 3 and is wound around the riser 16 of the tenth segment 15 adjacent to the ninth segment 15, and a winding terminating end 82 of the wire 14 is connected to the tenth segment 15.

Accordingly, the armature coil 9U1 of the U phase configured of the U phase coil 91a, the "−U phase" coil 92a and the "−U phase" coil 93a and wound N times is formed at the first tooth 12. In addition, the armature coil 9W1 of the W phase configured of the "−W phase" coil 91b, the "−W phase" coil 92b and the W phase coil 93b and wound N times is formed at the third tooth 12. Further, the armature coil 9V1 of the V phase configured of the V phase coil 91c, the "−V phase" coil 92c and the "−V phase" coil 93c and wound N times is formed at the fifth tooth 12.

The wire 14 having the winding starting end 81 wound around the riser 16 of the first segment 15 is drawn along with the wire 14 having the winding starting end 81 wound around the riser 16 of the above-mentioned tenth segment 15 and point-symmetrically about the rotation shaft 3.

Then, the armature coil 9V2 of the V phase configured of a V phase coil 91d, a "−V phase" coil 92d, and a "−V phase" coil 93d and wound N times is formed at the second tooth 12. In addition, the armature coil 9U2 of the U phase configured of a U phase coil 91e, a "−U phase" coil 92e and a "−U phase" coil 93e and wound N times is formed at the fourth tooth 12. Further, the armature coil 9W2 of the W phase configured of a "−W phase" coil 91f, a "−W phase" coil 92f and a W phase coil 93f and wound N times is formed at the sixth tooth 12.

In this way, the armature coil 9 is configured of the armature coils 9U1 and 9U2 of the U phase formed at the first and fourth teeth 12, the armature coils 9V1 and 9V2 of the V phase formed at the second and fifth teeth 12, and the armature coils 9W1 and 9W2 of the W phase formed at the third and sixth teeth 12, and the number of parallel circuits thereof is four.

Then, the phase coils 91a to 93f are electrically and sequentially connected between the neighboring segments 15 in sequence of U, "−W," "−W," V, "−U," "−U," W, "−V" and "−V" phases.

Here, as shown in FIG. 2, since the wire 14 is wound on the teeth 12 through the concentrated winding method, there is no crossover wire of the wire 14 that extends across neighboring teeth 12. That is, overlapping of a coil end 9a of the armature coil 9 at an end portion in the axial direction of the armature core 8 is reduced in comparison with the case in which the wire 14 is wound through the distributed winding method. For this reason, the end portion in the axial direction of the core main body 11 of the armature core 8 is not covered by the wire 14 but the hole 11b formed at the core main body 11 is exposed.

In addition, since the wire 14 between the armature core 8 and the riser 16 of the segment 15 is drawn to be wound around the rotation shaft 3, thickening of the winding under a head of the commutator 10 is suppressed.

Further, since a drawing direction of the wire 14 drawn between the armature core 8 and the commutator 10 and the wire 14 drawn to form the connecting wire 17 is set to the entirely same direction (right in FIG. 4) around the rotation shaft 3 the wire 14 is wound on the riser 16 of each of the segments 15 by an α turn.

The α turn will be described in detail based on FIG. 5.

Figure 5:
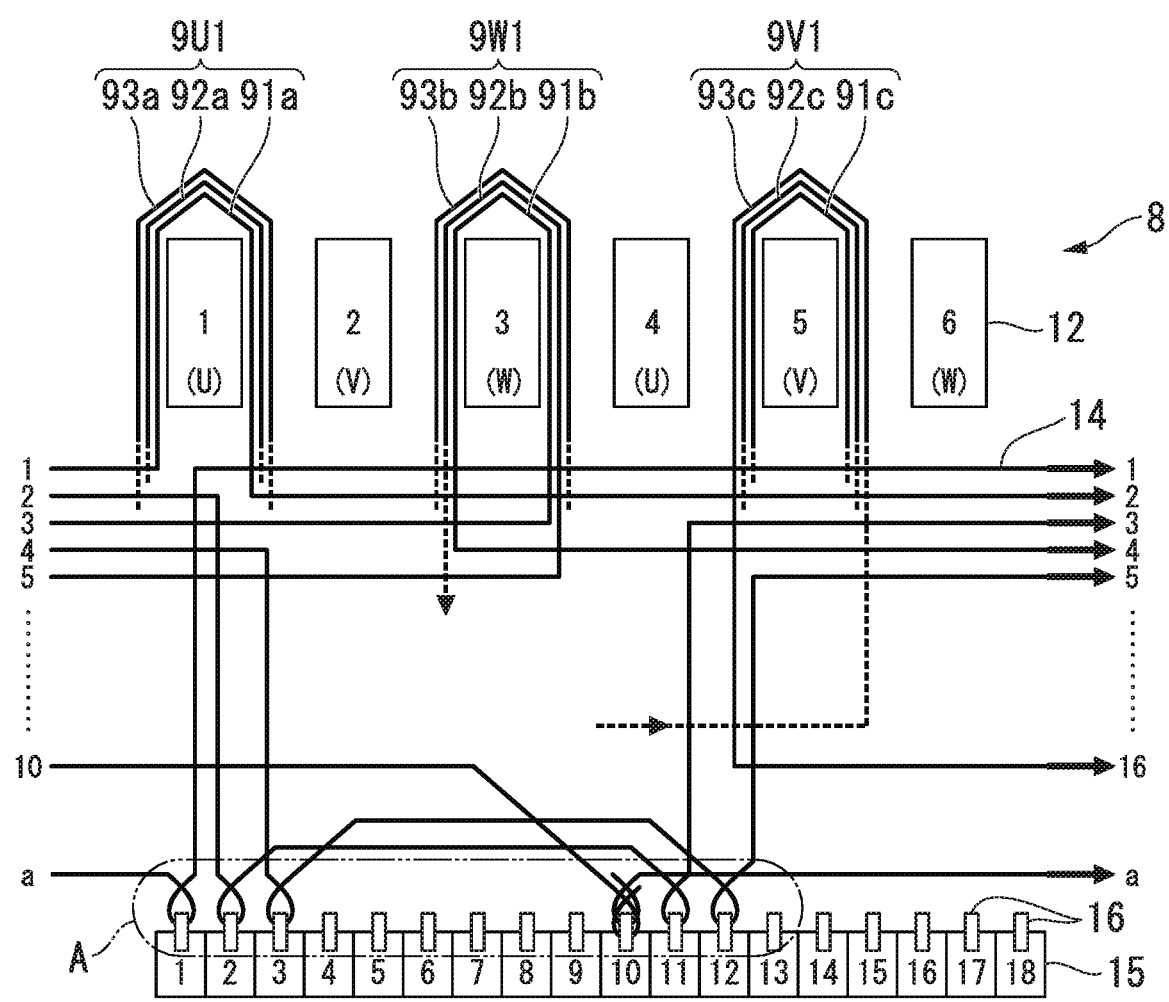
FIG. 5 is a view for describing a method of winding a wire around a riser of each segment according to the first embodiment of the present invention.

FIG. 5 is a view for describing a method of winding the wire around the riser of each of the segments.

As shown in FIG. 5, since a drawing direction of the wire 14 drawn between the armature core 8 and the commutator 10 and the wire 14 drawn to form the connecting wire 17 is set to the entirely same direction (right in FIG. 4) around the rotation shaft 3, the wire 14 wound around the riser 16 of each of the segments 15 is normally wound around the riser 16 from the left, and pulled out to the right. For this reason, as shown in a portion A of FIG. 5, the wire 14 is wound on the riser 16 by the α turn.

(Speed Reduction Mechanism)

As shown in FIG. 1, in the gear housing 23 to which the electric motor 2 is attached, the gear group 41 is received in the housing main body 42. The gear group 41 is configured of a worm shaft 25 connected to the rotation shaft 3 of the electric motor 2, a pair of stepped gears 26 and 26 meshed with the worm shaft 25, and a spur gear 27 meshed with the stepped gear 26.

The worm shaft 25 has one end connected to the rotation shaft 3 and the other end rotatably and axially supported by the housing main body 42. A connecting portion 24 of the worm shaft 25 and the rotation shaft 3, i.e., the other end of the rotation shaft 3, is rotatably supported by a roll bearing 32 installed at a bottom wall 31 of the brush-receiving portion 22 formed at the housing main body 42.

In addition, the worm shaft 25 has a first screw portion 25a and a second screw portion 25b, which are reversely screwed to each other. The first screw portion 25a and the second screw portion 25b are formed as single-start thread or double-start thread. However, the first screw portion 25a and the second screw portion 25b may be formed as multi-start thread with three or more starts.

The pair of stepped gears 26 and 26 are disposed at both sides with the worm shaft 25 sandwiched therebetween, and the pair of stepped gears 26 and 26 are meshed with the first screw portion 25a and the second screw portion 25b.

The pair of stepped gears 26 have a worm wheel 28 meshed with the worm shaft 25 and a small diameter gear 29 having a smaller diameter than the worm wheel 28 is integrally formed therewith. An idler shaft 61 is press-fitted into a center in the radial direction of the stepped gear 26. The idler shaft 61 protrudes at an opposite side of the small diameter gear 29, and a protruding end portion 61a is rotatably and axially supported by the housing main body 42. A front end of the small diameter gear 29 at an end of the idler shaft 61 opposite to the end portion 61a is rotatably and axially supported by the bottom plate 43.

In this way, both ends of the pair of stepped gears 26 are axially supported by the housing main body 42 and the bottom plate 43. Then, the pair of stepped gears 26 and 26 rotate in the same direction, and rotation of the worm shaft 25 is transmitted to the spur gear 27. That is, a marshal mechanism is constituted by the worm shaft 25 and the pair of stepped gears 26 and 26, and a thrust force applied to the worm shaft 25 is offset by the pair of stepped gears 26 and 26.

The spur gear 27 is meshed with the small diameter gear 29 of the stepped gear 26. A boss portion 65 protrudes from a center in the radial direction of the spur gear 27 toward the bottom plate 43. The boss portion 65 is rotatably supported by the bottom plate 43. In addition, an output shaft 62 is press-fitted into the boss portion 65. The output shaft 62 protrudes from a bottom wall (an end portion) 42c of the housing main body 42. A boss portion 63 protrudes outward from the bottom wall 42c of the housing main body 42 at an area corresponding to the output shaft 62. A sliding bearing 64 configured to rotatably and axially support the output shaft 62 is installed at the boss portion 63.

A tapered portion 66 gradually tapered toward the front end is formed at a portion of the output shaft 62 protruding from the housing main body 42. A serration 67 is formed at the tapered portion 66. Accordingly, for example, an external mechanism configured to drive a wiper or the like can be connected to the output shaft 62.

In addition, a connector 68 projects from the sidewall 42b of the housing main body 42 in the axial direction of the rotation shaft 3. The connector 68 is connected to a controller (not shown), and supplies power of an external power supply (not shown) to the electric motor 2.

A substrate 71 is disposed at an inner surface 43a of the bottom plate 43 configured to close the opening portion 42a of the housing main body 42. A terminal 72 configured to electrically connect the connector 68 and the electric motor 2 is installed at the substrate 71. In addition, contactors 73a and 73b are installed at the substrate 71. The contactors 73a and 73b are sliding contacts configured to detect a rotation position of the spur gear 27. Contact plates (not shown) are installed at areas with which the contactors 73a and 73b of the spur gear 27 come in sliding contact.

Then, the rotation position of the output shaft 62 can be detected as the contact positions between the contactors 73a and 73b and the contact plates (not shown) are varied or come in and out of contact with each other according to rotation of the spur gear 27, i.e., the output shaft 62. A signal detected by the contactors 73a and 73b is output to the controller (not shown) via the terminal 72, and rotation control of the electric motor 2 is performed.

(Action of Electric Motor)

Next, based on FIG. 4, an action of the electric motor 2 will be described.

For example, the case in which a voltage is applied between the low speed brush 21a and the common brush 21c in a state shown in FIG. 4 in which the low speed brush 21a is disposed between the first and second segments 15 and the common brush 21c is disposed at the sixth segment 15 will be described.

In this case, since the low speed brush 21a is disposed to extend across the first and second segments 15 and 15, forward wound coils 91a and 91e of the U phase are short-circuited.

Current flows in reverse (counterclockwise in FIG. 4) through "−U phase" coils 92a and 92e wound on the first tooth 12 and the fourth tooth 12. On the other hand, current flows forward (clockwise in FIG. 4) through "−U phase" coils 93a and 93e wound on the first tooth 12 and the fourth tooth 12. In this way, since currents flow in opposite directions through the "−U phase" coils 92a and 92e and the "−U phase" coils 93a and 93e wound on the first tooth 12 and the fourth tooth 12 and are not short-circuited by the brushes 21a and 21c, the magnetic fields are offset, and no torque is generated on the permanent magnet 7.

On the other hand, current flows forward through the V phase coils 91c and 91d, the "−V phase" coils 92c and 92d, and the "−V phase" coils 93c and 93d wound on the second tooth 12 and the fifth tooth 12.

Current flows in reverse through the "−W phase" coils 91b and 91f, the "−W phase" coils 92b and 92f, and the W phase coils 93b and 93f wound on the third tooth 12 and the sixth tooth 12.

Then, magnetic fields are formed at the second, third, fifth and sixth teeth 12. Since directions of the magnetic fields are provided in sequence in the circumferential direction, a magnetic attractive force or a repulsive force is applied in the same direction at point-symmetrical positions about the rotation shaft 3 between the magnetic field formed at the teeth 12 and the permanent magnet 7. Then, according to the force, the rotation shaft 3 is rotated.

When the rotation shaft 3 starts to rotate, the segments 15 in contact with the brushes 21a and 21c are sequentially changed and a direction of the current flowing through the coil is shifted, i.e., rectification is performed. Accordingly, the rotation shaft 3 is continuously rotated.

On the other hand, when the voltage is applied between the high speed brush 21b and the common brush 21c, since the high speed brush 21b is at a position angularly advanced more than the low speed brush 21a by the angle θ (see FIGS. 3 and 4), in comparison with the case in which the voltage is applied between the low speed brush 21a and the common brush 21c, the number of effective conductors to which an electric current is applied is reduced. For this reason, when the voltage is applied between the high speed brush 21b and the common brush 21c, the electric motor 2 is angularly advanced and operated at a higher speed than when the voltage is applied between the low speed brush 21a and the common brush 21c.

(Effects)

Accordingly, according to the above-mentioned first embodiment, the four permanent magnets 7 are installed at the yoke 5, the six slots 13 are formed in the armature core 8, the eighteen segments 15 are installed at the commutator 10, and the order determined by the least common multiple between the number of magnetic poles and the number of slots can be set to 12. On the other hand, in the electric motor of the related art, since the number of magnetic poles is set to 4 and the number of slots is set to 16, the order is 32. For this reason, since the order can be reduced in comparison with the related art without deteriorating the motor performance, generation of high frequency noise can be prevented during the high speed rotation of the electric motor 2.

In addition, while the number of slots of the related art is 16, since the number of slots of the armature core 8 is 6, the shape of the armature core 8 can be simplified and productivity of the armature 6 can be increased to the extent to which the number of slots is reduced.

Further, the size of each of the slots 13 can be set to be larger according to the extent to which the number of slots is reduced. For this reason, the number of windings of the wire 14 on the teeth 12 can be set to be large, and as a result, the armature core 8 can be reduced in size and weight.

Then, since the number of segments is set to three times the number of slots, the number of segments per pole pair is increased to be larger than that of the related art. For this reason, the voltage between the segments 15 can be reduced, and rectification can be improved in comparison with the related art. In addition, since the number of effective conductors of the armature coil 9 per segment 15 is reduced, speed can be easily varied using the high speed brush 21b.

In addition, since the wire 14 is wound on the teeth 12 through the concentrated winding method, the crossover line of the wire 14 that extends across the neighboring teeth 12 can be removed. A wire rod cost of the armature coil 9 can be reduced to that extent, and an inexpensive electric motor 2 can be provided.

Further, since the wire 14 is wound on the teeth 12 through the concentrated winding method, the space factor of the wire 14 can be improved in comparison with the case in which the wire 14 is wound through the distributed winding method as described in the related art, and overlapping of the coil end 9a can be reduced. For this reason, since copper loss can be reduced, high efficiency of the electric motor 2 can be achieved. Then, the armature core 8 can be reduced in size and axial length while having the same motor performance.

Then, the end portion in the axial direction of the core main body 11 of the armature core 8 is not covered by the wire 14 because the crossover line of the wire 14 is removed. For this reason, the hole 11b formed at the core main body 11 can be securely exposed, and convection of the air in the electric motor 2 can be promoted. For this reason, an increase in temperature of the electric motor 2 can be suppressed, and motor efficiency can be improved.

In addition, since the wire 14 drawn between the armature core 8 and the commutator 10 is drawn in the same direction (right in FIG. 4) around the rotation shaft 3 as a whole, an operation direction of the winding apparatus (not shown) for drawing the wire 14 can be constantly maintained. For this reason, a load to the winding apparatus (not shown) can be reduced, workability of winding the wire 14 can be improved, irregularity of tension applied to the wire 14 is prevented, and further, a space factor can be improved. Accordingly, motor performance of the electric motor 2 can be improved while reducing a production cost.

Further, in addition to the wire 14 drawn between the armature core 8 and the commutator 10, the drawing direction of the wire 14 drawn to form the connecting wire 17 is also set to the same direction (right in FIG. 4), and the wire 14 is wound on the riser 16 of the segment 15 by the α turn. For this reason, a connection error between the segment 15 and the wire 14 can be securely prevented. In addition, since stretching of the wire 14 under the head of the commutator 10 can be securely suppressed, contact between the wires 14 wound around the neighboring risers 16 can be suppressed, and generation of heat can be suppressed.

Suppression of generation of the connection error and heat of the wire 14 will be described based on FIGS. 6 and 7.

Figure 6:
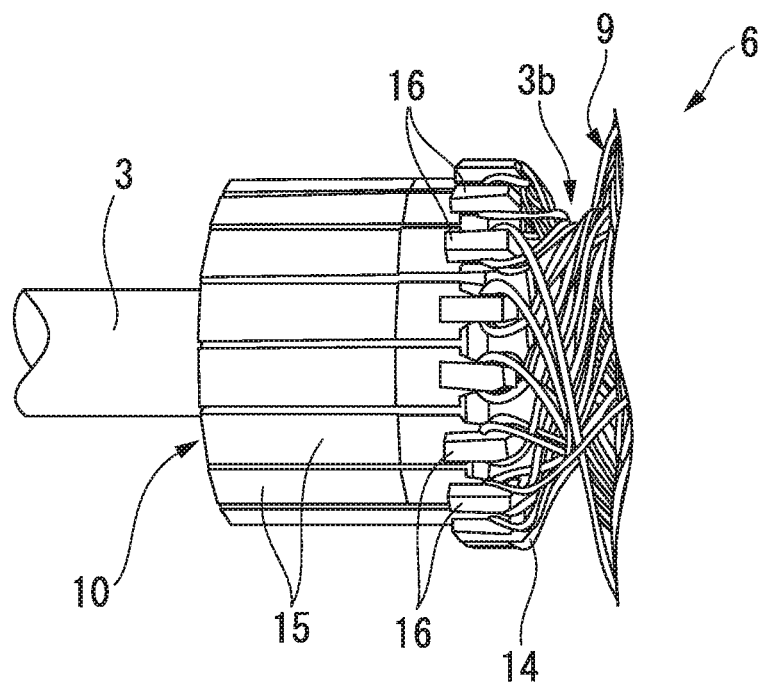
FIG. 6 is an enlarged perspective view of a riser portion of a commutator according to the first embodiment of the present invention, showing a state in which a wire is wound on the riser by an α turn.
Figure 7:
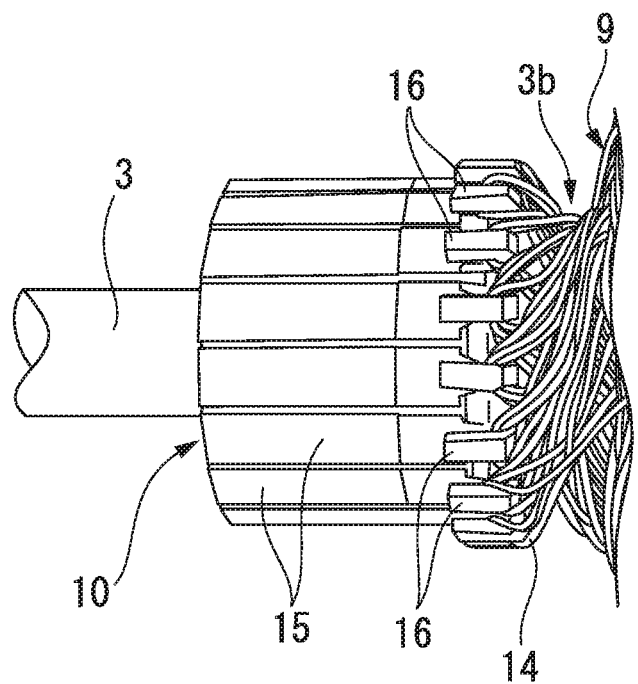
FIG. 7 is an enlarged perspective view of the riser portion of the commutator according to the first embodiment of the present invention, showing a state in which the wire is not wound on the riser by the α turn.

FIG. 6 is an enlarged perspective view of a riser portion of the commutator, showing a state in which the wire is wound on the riser by the α turn. FIG. 7 is an enlarged perspective view of the riser portion of the commutator, showing a state in which the wire is not wound on the riser by the α turn.

As shown in FIG. 6, as the wire 14 is wound on each of the risers 16 by the α turn, the wire 14 is wound around and encloses a periphery of each of the risers 16. On the other hand, when the wire 14 is not wound on the riser 16 by the α turn, in other words, when the wire 14 is wound on the riser 16 in a U winding shape, the wire 14 is merely hooked on the riser 16. For this reason, as the wire 14 is wound on the risers 16 by the a turn, a connection error of the segment 15 and the wire 14 can be securely prevented.

In addition, as shown in FIG. 6, as the wire 14 is wound on the risers 16 by the a turn, the wire 14 crosses under the head of the commutator 10, and stretching of the wire 14 under the head of the commutator 10 is suppressed. On the other hand, when the wire 14 is not wound on the riser 16 by the α turn, the wire 14 does not cross under the head of the commutator 10, and the wire 14 is stretched. In this way, when the wire 14 is stretched under the commutator 10, the wires 14 wound around the neighboring risers 16 come in contact with each other, and generation of the heat is promoted. For this reason, as the wire 14 is wound on the risers 16 by the α turn, generation of the heat can be suppressed.

Second Embodiment

Next, a second embodiment of the present invention will be described based on FIG. 8 while incorporating FIGS. 1 and 2.

Figure 8:
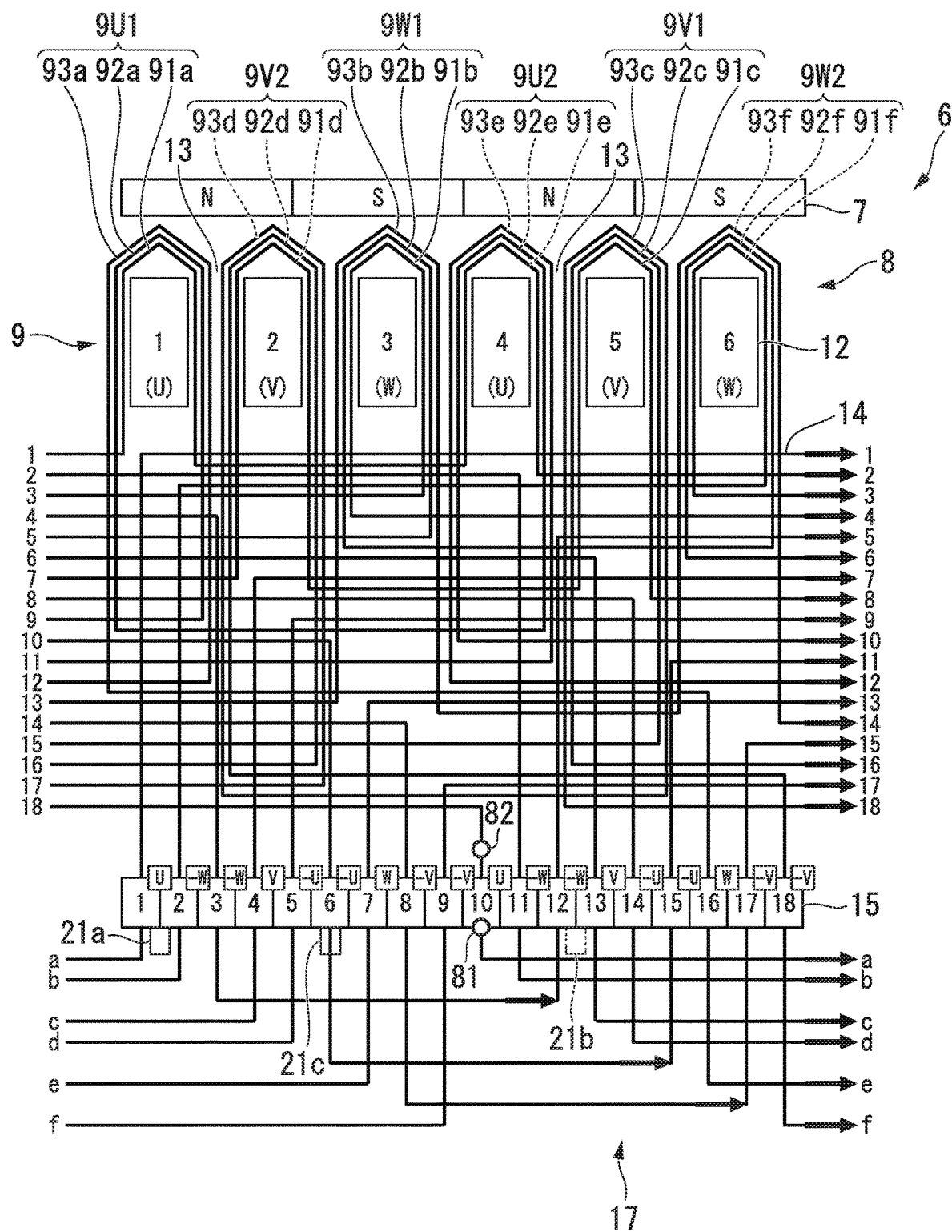
FIG. 8 is a development view of an armature according to a second embodiment of the present invention.

FIG. 8 is a development view of an armature according to the second embodiment, corresponding to FIG. 4. Further, the same components as the first embodiment are designated by the same reference numerals (this also applies to subsequent embodiments).

In the second embodiment, basic configurations of the reduction motor 1 are similar to the first embodiment in that, for example, the motor is used for driving a wiper of an automobile and includes the electric motor 2 and the speed reduction mechanism 4 connected to the rotation shaft 3 of the electric motor 2, the electric motor 2 has the bottomed cylindrical yoke 5 and the armature 6 rotatably installed in the yoke 5, the electric motor 2 is the four-pole six-slot eighteen-segment electric motor in which the number of permanent magnets 7 disposed at the yoke 5 is set to four, the number of slots 13 formed at the armature core 8 is set to six, and the number of the segments 15 installed at the commutator 10 is set to eighteen, the U phase, the V phase and the W phase teeth 12 are allocated in this order in the circumferential direction, the segments 15 having the same electric potential are short-circuited by the connecting wire 17, the armature coil 9 wound on the teeth 12 and the connecting wire 17 are formed on the armature core 8 or the riser 16 of the commutator 10 by winding the wire 14 through the double flyer method, the drawing direction of the wire 14 drawn between the armature core 8 and the commutator 10 and the wire 14 drawn to form the connecting wire 17 is set in the same direction around the rotation shaft 3 as a whole, and so on (this also applies to the following embodiments).

Here, the second embodiment is distinguished from the above-mentioned first embodiment in that, in the armature coils 9U1 to 9W2 formed at the teeth 12 of the first embodiment, while the wire 14 is connected to the predetermined segment 15 whenever the phase coils 91a to 93f are formed, in the armature coils 9U1 to 9W2 formed at the teeth 12 of the second embodiment, the phase coils 91a to 93f wound in the same phase and the same direction are continuously formed at the corresponding two teeth 12.

(Wire Connecting Structure of Connecting Wire, and Winding Structure of Armature Coil)

Hereinafter, the wire connecting structure of the connecting wire 17 and the winding structure of the armature coil 9U1 to 9W2 will be described in detail.

Further, like the above-mentioned first embodiment, winding start positions of the wire 14 will be described as the first segment 15 and the tenth segment 15. In addition, since a drawing sequence of the wire 14 for which winding starts from the first segment 15 and the wire 14 for which winding starts from the tenth segment 15 is point-symmetrical about the rotation shaft 3, in the following description, only the wire 14 for which winding starts from the tenth segment 15 will be described.

The wire 14 having the winding starting end 81 wound around the riser 16 of the tenth segment 15 is drawn to the right while being wound around the rotation shaft 3, and then wound around the first segment 15 having the same electric potential as the tenth segment 15. Then, when the wire 14 is drawn from the commutator 10 toward the armature core 8, the wire 14 is drawn to the right while being wound around the rotation shaft 3 and pulled into the slot 13 between the first and sixth teeth 12. Next, when the wire 14 is wound on the teeth 12 N (N is a natural number of 1 or more) times, the wire 14 is wound forward on the first tooth 12 N/6 times to form the U phase coil 91*a*.

Next, the wire 14 is pulled out of the slot 13 between the first and second teeth 12, and the wire 14 is drawn to the right and pulled into the slot 13 between the third and fourth teeth 12. Then, the wire 14 is wound forward on the fourth tooth 12 N/6 times to form the U phase coil 91*e*. Next, the wire 14 is pulled out of the slot 13 between the fourth and fifth teeth 12, and the wire 14 is drawn to the right while being wound around the rotation shaft 3 and wound around the riser 16 of the eleventh segment 15 adjacent to the tenth segment 15.

Next, the wire 14 is drawn to the right while being wound around the rotation shaft 3, and wound around the riser 16 of the second segment 15 having the same electric potential as the eleventh segment 15. Once more, when the wire 14 is drawn from the commutator 10 toward the armature core 8, the wire 14 is drawn to the right while being wound around the rotation shaft 3 and pulled into the slot 13 between the first and sixth teeth 12. Then, the wire 14 is wound in reverse on the sixth tooth 12 N/6 times to form the "−W phase" coil 91*f*.

Next, the wire 14 is pulled out of the slot 13 between the fifth and sixth teeth 12, and the wire 14 is drawn to the right and pulled into the slot 13 between the third and fourth teeth 12. Then, the wire 14 is wound in reverse on the third tooth 12 N/6 times to form the "−W phase" coil 91*b*. Next, the wire 14 is pulled out of the slot 13 between the second and third teeth 12, and the wire 14 is drawn to the right while being wound around the rotation shaft 3 and wound around the riser 16 of the third segment 15 adjacent to the second segment 15.

Next, the wire 14 is drawn to the right while being wound around the rotation shaft 3, and wound around the riser 16 of the twelfth segment 15 having the same electric potential as the third segment 15. Once more, when the wire 14 is drawn from the commutator 10 toward the armature core 8, the wire 14 is drawn to the right while being wound around the rotation shaft 3 and pulled into the slot 13 between the third and fourth teeth 12. Then, the wire 14 is wound in reverse on the third tooth 12 N/6 times to form the "−W phase" coil 92*b*.

Next, the wire 14 is pulled out of the slot 13 between the second and third teeth 12, and the wire 14 is drawn to the right and pulled into the slot 13 between the first and sixth teeth 12. Then, the wire 14 is wound in reverse on the sixth tooth 12 N/6 times to form the "−W phase" coil 92*f*. Next, the wire 14 is pulled out of the slot 13 between the fifth and sixth teeth 12, and the wire 14 is drawn to the right while being wound around the rotation shaft 3 and wound around the riser 16 of the thirteenth segment 15 adjacent to the twelfth segment 15.

Next, the wire 14 is drawn to the right while being wound around the rotation shaft 3, and wound around the riser 16 of the fourth segment 15 having the same electric potential as the thirteenth segment 15. Once more, when the wire 14 is drawn from the commutator 10 toward the armature core 8, the wire 14 is drawn to the right while being wound around the rotation shaft 3 and pulled into the slot 13 between the first and second teeth 12. Then, the wire 14 is wound forward on the second tooth 12 N/6 times to form the V phase coil 91*d*.

Next, the wire 14 is pulled out of the slot 13 between the second and third teeth 12, and the wire 14 is drawn to the right and pulled into the slot 13 between the fourth and fifth teeth 12. Then, the wire 14 is wound forward on the fifth tooth 12 N/6 times to form the V phase coil 91*c*. Next, the wire 14 is pulled out of the slot 13 between the fifth and sixth teeth 12, and the wire 14 is drawn to the right while being wound around the rotation shaft 3 and wound around the riser 16 of the fourteenth segment 15 adjacent to the thirteenth segment 15.

Next, the wire 14 is drawn to the right while being wound around the rotation shaft 3*m* and wound around the riser 16 of the fifth segment 15 having the same electric potential as the fourteenth segment 15. Once more, when the wire 14 is drawn from the commutator 10 toward the armature core 8, the wire 14 is drawn to the right while being wound around the rotation shaft 3 and pulled into the slot 13 between the first and second teeth 12. Then, the wire 14 is wound in reverse on the first tooth 12 N/6 times to form the "−U phase" coil 92*a*.

Next, the wire 14 is pulled out of the slot 13 between the first and sixth teeth 12, and the wire 14 is drawn to the right and pulled into the slot 13 between the fourth and fifth teeth 12. Then, the wire 14 is wound in reverse on the fourth tooth 12 N/6 times to form the "−U phase" coil 92*e*. Next, the wire 14 is pulled out of the slot 13 between the third and fourth teeth 12, and the wire 14 is drawn to the right while being wound around the rotation shaft 3 and wound around the riser 16 of the sixth segment 15 adjacent to the fifth segment 15.

Next, the wire 14 is drawn to the right while being wound around the rotation shaft 3 and wound around the riser 16 of the fifteenth segment 15 having the same electric potential as the sixth segment 15. Once more, when the wire 14 is drawn from the commutator 10 toward the armature core 8, the wire 14 is drawn to the right while being wound around the rotation shaft 3 and pulled into the slot 13 between the fourth and fifth teeth 12. Then, the wire 14 is wound in reverse on the fourth tooth 12 N/6 times to form the "−U phase" coil 93*e*.

Next, the wire 14 is pulled out of the slot 13 between the third and fourth teeth 12, and the wire 14 is drawn to the right and pulled into the slot 13 between the first and second teeth 12. Then, the wire 14 is wound in reverse on the first tooth 12 N/6 times to form the "−U phase" coil 93*a*. Next, the wire 14 is pulled out of the slot 13 between the first and sixth teeth 12, and the wire 14 is drawn to the right while being wound around the rotation shaft 3 and wound around the riser 16 of the sixteenth segment 15 adjacent to the fifteenth segment 15.

Next, the wire 14 is drawn to the right while being wound around the rotation shaft 3 and wound around the riser 16 of the seventh segment 15 having the same electric potential as the sixteenth segment 15. Once more, when the wire 14 is drawn from the commutator 10 toward the armature core 8, the wire 14 is drawn to the right while being wound around the rotation shaft 3 and pulled into the slot 13 between the second and third teeth 12. Then, the wire 14 is wound forward on the third tooth 12 N/6 times to form the W phase coil 93*b*.

Next, the wire 14 is pulled out of the slot 13 between the third and fourth teeth 12, and the wire 14 is drawn to the right and pulled into the slot 13 between the fifth and sixth teeth 12. Then, the wire 14 is wound forward on the sixth tooth 12 N/6 times to form the W phase coil 93*f*. Next, the wire 14 is pulled out of the slot 13 between the first and sixth teeth 12, and the wire 14 is drawn to the right while being wound around the rotation shaft 3 and wound around the riser 16 of the eighth segment 15 adjacent to the seventh segment 15.

Next, the wire 14 is drawn to the right while being wound around the rotation shaft 3 and wound around the riser 16 of the seventeenth segment 15 having the same electric potential as the eighth segment 15. Once more, when the wire 14 is drawn from the commutator 10 toward the armature core 8, the wire 14 is drawn to the right while being wound around the rotation shaft 3 and pulled into the slot 13 between the fifth and sixth teeth 12. Then, the wire 14 is wound in reverse on the fifth tooth 12 N/6 times to form the "−V phase" coil 92*c*.

Next, the wire 14 is pulled out of the slot 13 between the fourth and fifth teeth 12, and the wire 14 is drawn to the right and pulled into the slot 13 between the second and third teeth 12. Then, the wire 14 is wound in reverse on the second tooth 12 N/6 times to form a "−W phase" coil 92*d*. Next, the wire 14 is pulled out of the slot 13 between the first and second teeth 12, and the wire 14 is drawn to the right while being wound around the rotation shaft 3 and wound around the riser 16 of the eighteenth segment 15 adjacent to the seventeenth segment 15.

Next, the wire 14 is drawn to the right while being wound around the rotation shaft 3 and wound around the riser 16 of the ninth segment 15 having the same electric potential as the eighteenth segment 15. Once more, when the wire 14 is drawn from the commutator 10 toward the armature core 8, the wire 14 is drawn to the right while being wound around the rotation shaft 3 and pulled into the slot 13 between the second and third teeth 12. Then, the wire 14 is wound in reverse on the second tooth 12 N/6 times to form the "−V phase" coil 93*d*.

Next, the wire 14 is pulled out of the slot 13 between the first and second teeth 12, and the wire 14 is drawn to the right and pulled into the slot 13 between the fifth and sixth teeth 12. Then, the wire 14 is wound in reverse on the fifth tooth 12 N/6 times to form the "−V phase" coil 93*c*. Next, the wire 14 is pulled out of the slot 13 between the fourth and fifth teeth 12, the wire 14 is drawn to the right while being wound around the rotation shaft 3 and wound around the riser 16 of the tenth segment 15 adjacent to the ninth segment 15, and the winding terminating end 82 of the wire 14 is connected to the tenth segment 15.

Accordingly, the armature coil 9U1 of the U phase constituted by the U phase coil 91*a*, the "−U phase" coil 92*a* and the "−U phase" coil 93*a* and wound N/2 times is formed at the first tooth 12. In addition, the armature coil 9W1 of the W phase constituted by the "−W phase" coil 91*b*, the "−W phase" coil 92*b* and the W phase coil 93*b* and wound N/2 times is formed at the third tooth 12. Further, the armature coil 9V1 of the V phase constituted by the V phase coil 91*c*, the "−V phase" coil 92*c* and the "−V phase" coil 93*c* and wound N/2 times is formed at the fifth tooth 12.

Then, the phase coils 91*a* to 93*f* having the same phase and wound in the same direction are continuously formed on the corresponding two teeth 12.

The wire 14 having the winding starting end 81 wound around the riser 16 of the first segment 15 is drawn along with the wire 14 having the winding starting end 81 wound around the riser 16 of the above-mentioned tenth segment 15 and point-symmetrically with respect to the rotation shaft 3. Then, the armature coils 9U1 to 9W2 of the phases wound N/2 times are formed.

Accordingly, the armature coil 9 is configured of the armature coils 9U1 and 9U2 of the U phase formed at the first and fourth teeth 12, the armature coils 9V1 and 9V2 of the V phase formed at the second and fifth teeth 12, and the armature coils 9W1 and 9W2 of the W phase formed at the third and sixth teeth 12, and the number of parallel circuits is four.

Here, when the number times N that the wire 14 of each phase of the armature coils 9U1 to 9W2 is wound is an odd number, a number of winding times may be increased by one turn in one of winding processes in which the winding is started from the first segment 15 or started from the tenth segment 15, and the number of winding times may be reduced by one turn in the other of the winding processes.

Accordingly, in the above-mentioned second embodiment, the same effect as the above-mentioned first embodiment is obtained.

Third Embodiment

Next, a third embodiment of the present invention will be described based on FIGS. 9 and 10.

Figure 9:
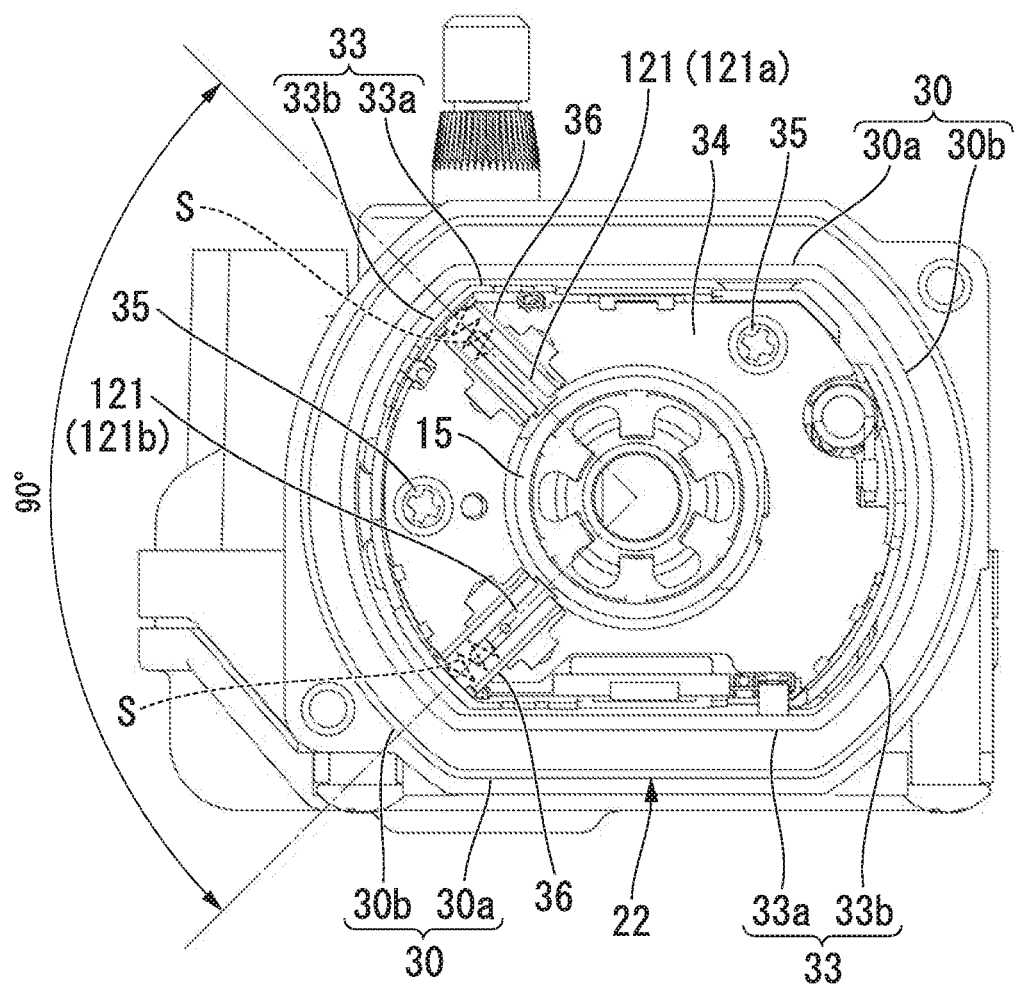
FIG. 9 is a plan view of a brush-receiving portion according to a third embodiment of the present invention.

FIG. 9 is a plan view of a brush-receiving portion according to the third embodiment, corresponding to FIG. 3. In addition, FIG. 10 is a development view of an armature according to the third embodiment, corresponding to FIG. 4.

Figure 10:
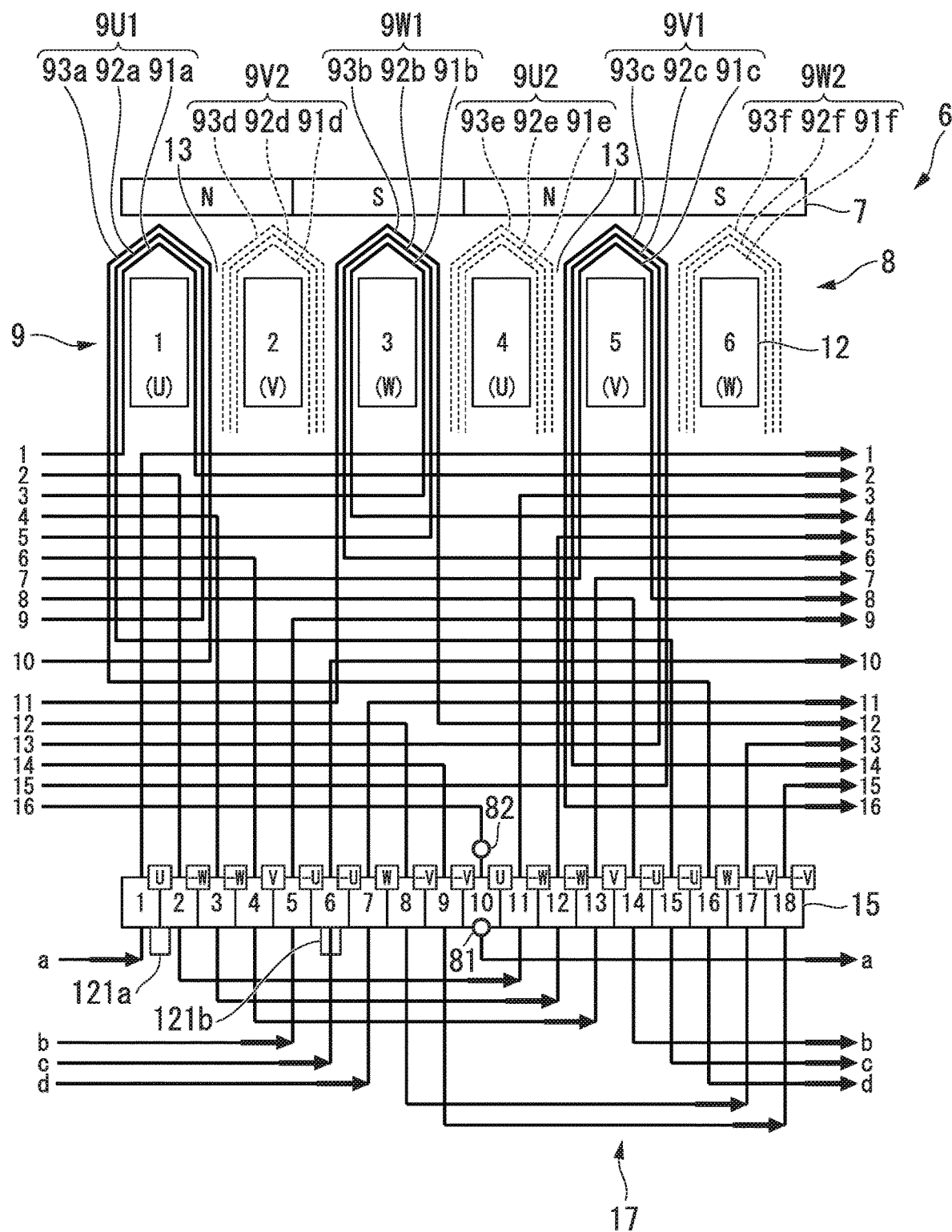
FIG. 10 is a development view of an armature according to the third embodiment of the present invention.

As shown in FIGS. 9 and 10, the third embodiment is distinguished from the above-mentioned first embodiment in that, in the first embodiment, while the brushes 21 are configured of three brushes 21, i.e., the low speed brush 21*a* and the high speed brush 21*b* connected to the positive electrode side and the common brush 21*c* used in common with the low speed brush 21*a* and the high speed brush 21*b* and connected to the negative electrode side, in the third embodiment, brushes 121 are configured of two brushes 121, i.e., a positive electrode-side brush 121*a* connected to the positive electrode side and a negative electrode-side brush 121*b* connected to the negative electrode side.

The positive electrode-side brush 121*a* and the negative electrode-side brush 121*b* are disposed at an interval of an electrical angle of 180°, i.e., an interval of a mechanical angle of 90° in the circumferential direction.

When the reduction motor 1 having the above-mentioned configuration is used for driving, for example, a wiper of an automobile, wiper blades are reciprocated using two reduction motors 1. Accordingly, the same effect as the above-mentioned first embodiment can be obtained. In addition, a reciprocating sweeping-out range in which the wiper blades are disposed between a lower inversion position and an upper inversion position can be adjusted, or a receiving position of the wiper upon non-use of the wiper blade can be set further inside a vehicle body than the lower inversion position of the wiper upon use of the wiper to improve aesthetic properties of the entire automobile.

Further, the present invention is not limited to the above-mentioned embodiments, but various modifications may be added to the above-mentioned embodiments without departing from the spirit of the present invention.

For example, in the above-mentioned second embodiment, the case in which the phase coils 91*a* to 93*f* are formed while winding the wire 14 on each of the teeth 12 N/6 times through the double flyer method has been described. However, the present invention is not limited thereto, but the phase coils 91*a* to 93*f* may be formed by winding the wire 14 on each of the teeth 12 N/3 times through a single flyer method. That is, the phase coils 91*a* to 93*f* may be formed at the teeth 12 at a time. In the configuration described above, the number of parallel circuits is two.

Fourth Embodiment (Reduction Motor)

Next, a fourth embodiment of the present invention will be described based on FIGS. 11 to 18.

Figure 11:
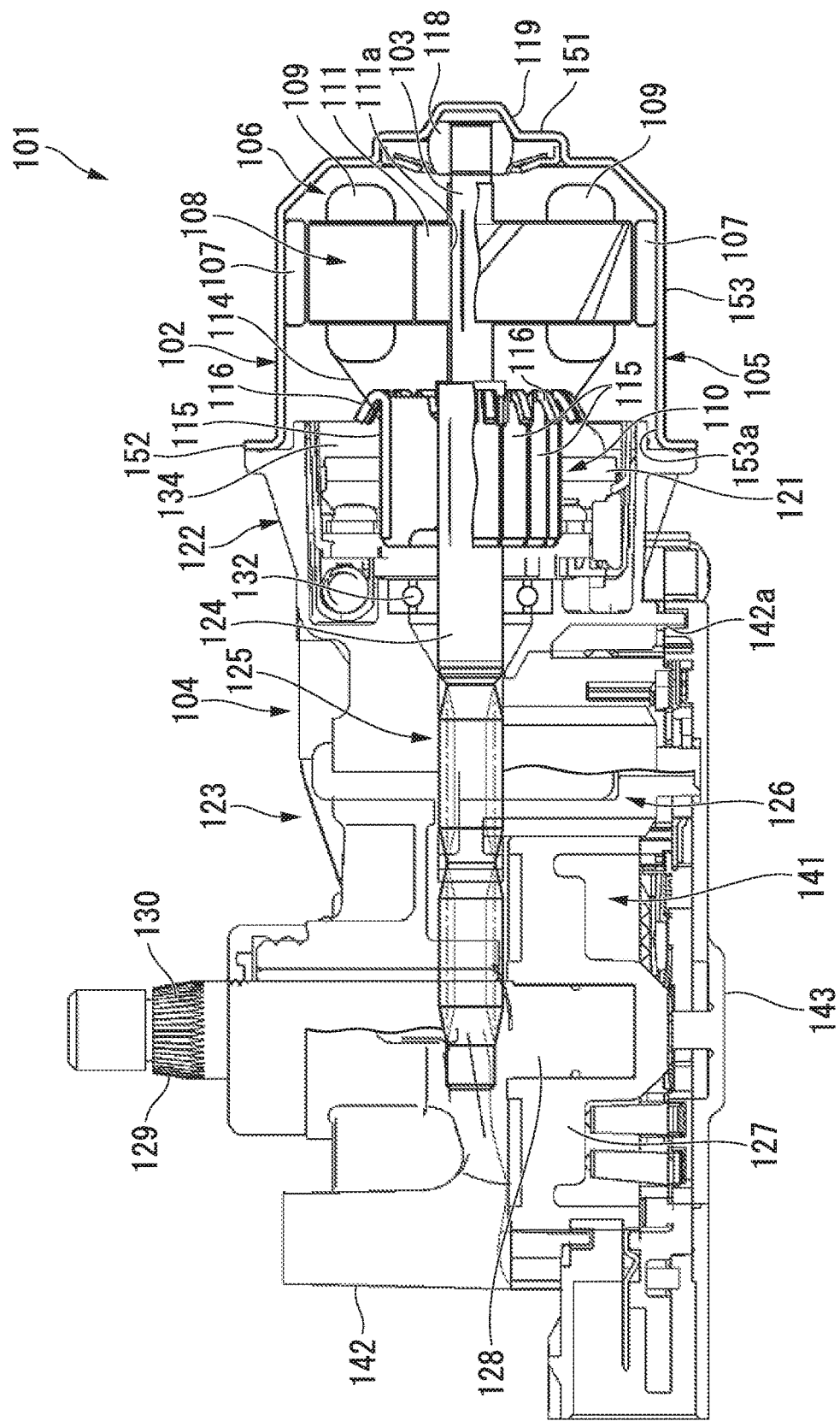
FIG. 11 is a longitudinal cross-sectional view of a reduction motor according to a fourth embodiment of the present invention.

FIG. 11 is a longitudinal cross-sectional view of a reduction motor to which the electric motor according to the present invention is applied.

As shown in FIG. 11, a reduction motor 101 is used for, for example, a wiper for an automobile, and includes an electric motor 102 and a speed reduction mechanism 104 connected to a rotation shaft 103 of the electric motor 102. The electric motor 102 has a bottomed cylindrical yoke 105, and an armature 106 rotatably installed in the yoke 105.

A cylindrical portion 153 of the yoke 105 is formed in a substantially cylindrical shape, and four segment-type magnets 107 are disposed at an inner circumferential surface of the cylindrical portion 153. Further, the magnet 107 is not limited to the segment type but a ring type may be used.

A bearing housing 119 protruding outward in the axial direction from a center in the radial direction is formed at a bottom wall (an end portion) 151 of the yoke 105, and a sliding bearing 118 configured to rotatably and axially support one end of the rotation shaft 103 is installed at the bearing housing 119. The sliding bearing 118 has a centering function of the rotation shaft 103.

An outer flange portion 152 is installed at an opening portion 153a of the cylindrical portion 153. A bolt hole (not shown) is formed in the outer flange portion 152. As a bolt (not shown) is inserted through the bolt hole and threadedly inserted into a bolt hole (not shown) formed in a gear housing 123 (to be described below) of the speed reduction mechanism 104, the yoke 105 is fastened and fixed to the speed reduction mechanism 104.

Figure 12:
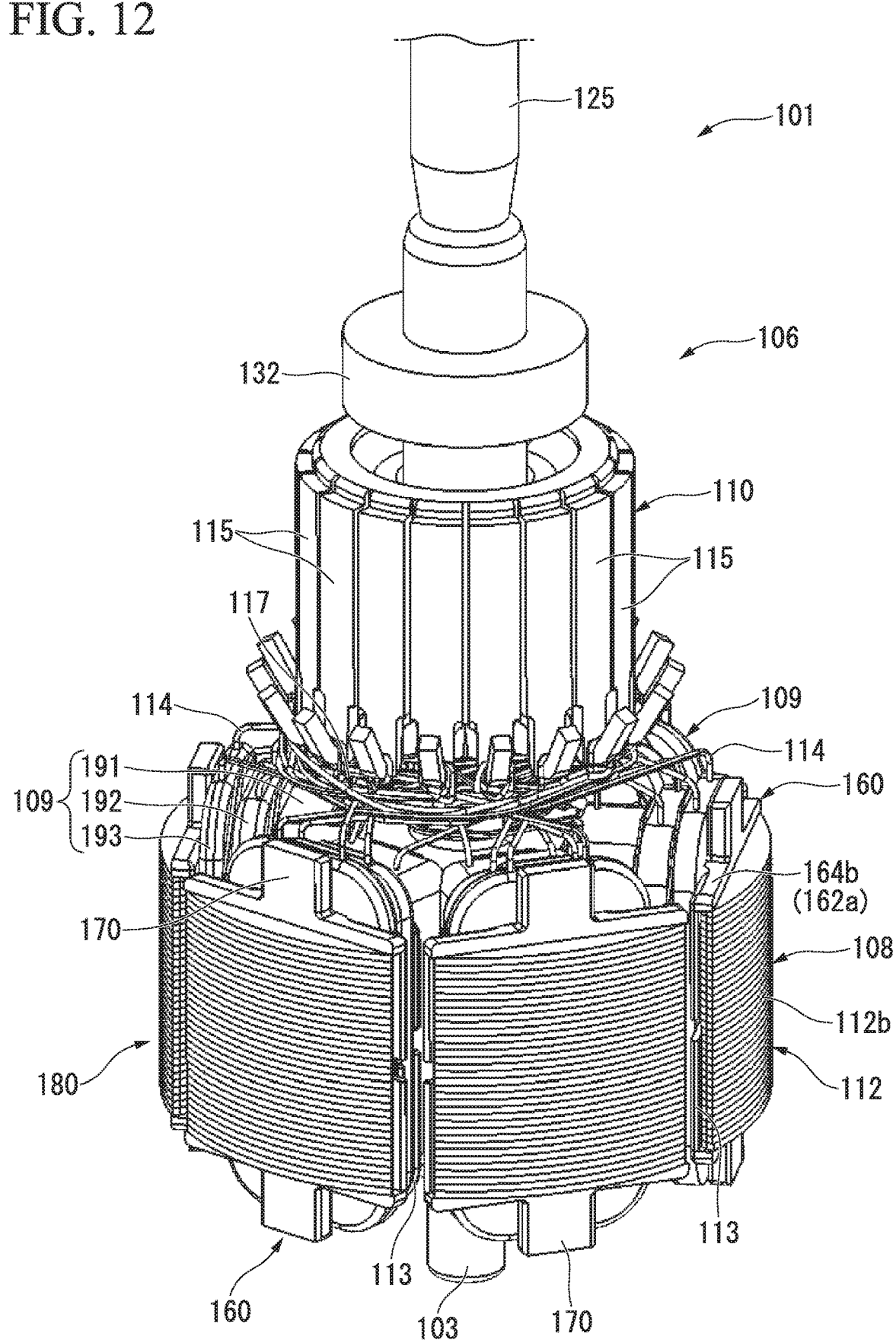
FIG. 12 is a perspective view of an armature according to the fourth embodiment of the present invention.
Figure 13:
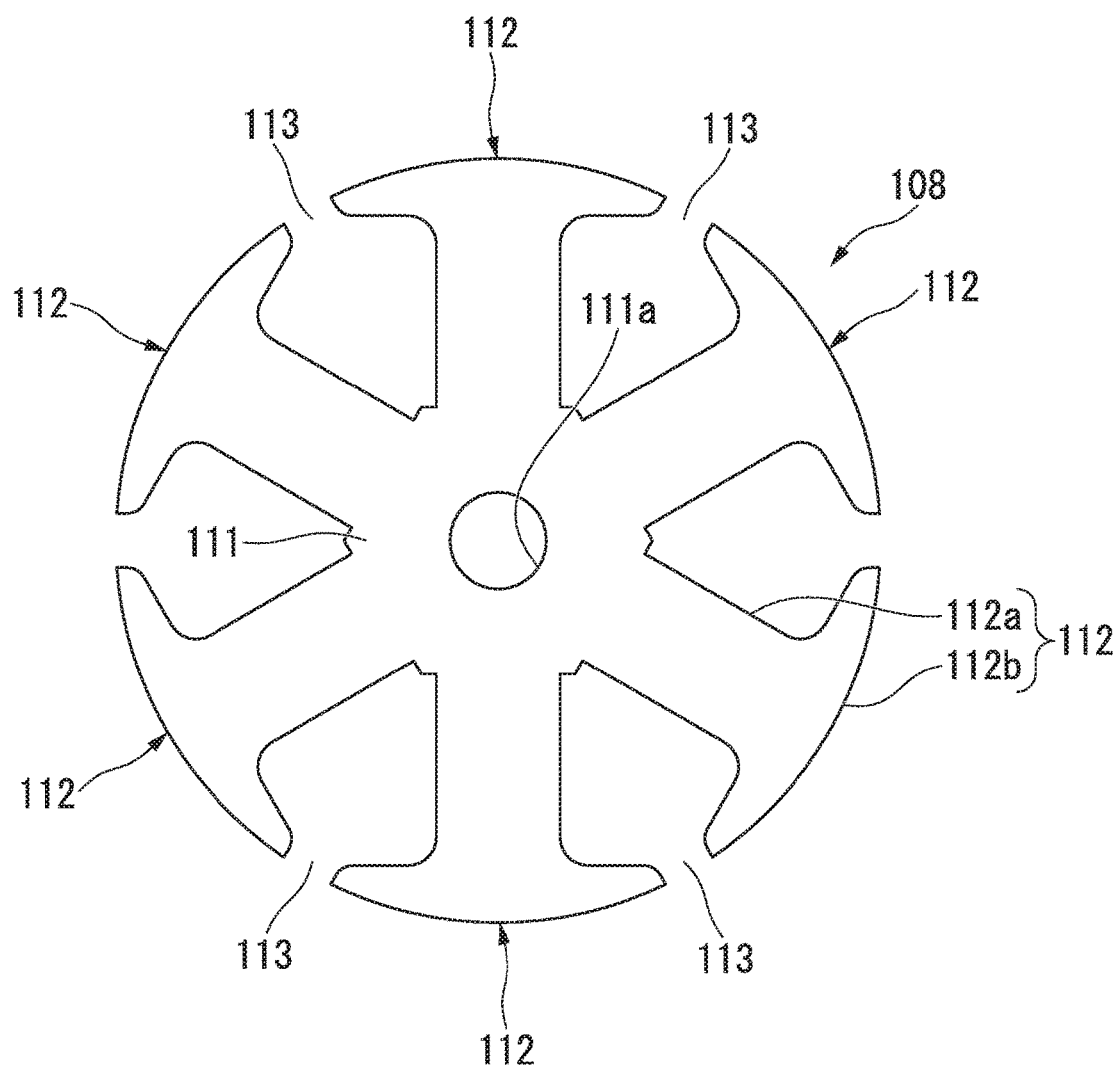
FIG. 13 is a plan view of an armature core according to the fourth embodiment of the present invention.

FIG. 12 is a perspective view of the armature, and FIG. 13 is a plan view of the armature core that constitutes the armature.

As shown in FIGS. 11 to 13, the armature 106 includes an armature 180 fitted and fixed onto the rotation shaft 103, and a commutator 110 disposed at the other end (the speed reduction mechanism 104 side) of the rotation shaft 103.

The armature 180 has an armature core 108, an armature coil 109 formed at the armature core 108, and an insulator 160 configured to insulate the armature core 108 and the armature coil 109.

The armature core 108 is formed by stacking a magnetic plate member punched by pressing in the axial direction (a stacked core) or pressure-forming a soft magnetic powder (a pressed powder core), and has a substantially columnar core main body 111.

As shown in FIG. 13, a through-hole 111a into which the rotation shaft 103 is press-fitted is formed at substantially a center in the radial direction of the core main body 111. In addition, six teeth 112 are installed at an outer circumferential portion of the core main body 111. Each of the teeth 112 is formed in substantially a T shape when seen from a plan view in the axial direction, and configured of a winding drum 112a radially protruding from the core main body 111 in the radial direction, and a flange 112b extending from a front end of the winding drum 112a in the circumferential direction and constituting an outer circumference of the armature core 108.

According to the above-mentioned configuration, six dovetail groove-shaped slots 113 are formed between the neighboring teeth 112. A wire 114 passes through these slots 113, and the wire 114 is wound on the winding drum 112a of the teeth 112 to form the armature coil 109 (a method of forming the armature coil 109 will be described below in detail).

As shown in FIGS. 11 and 12, eighteen segments 115 formed of a conductive material are attached to the outer circumferential surface of the commutator 110 fitted and fixed onto the other end side closer than the rotation shaft 103 from the armature core 108. The segments 115 are formed of a plate-shaped metal piece elongated in the axial direction, and are insulated from each other and fixed in the circumferential direction in parallel at equal intervals.

In this way, the electric motor 102 is constituted by a four-pole six-slot eighteen-segment electric motor in which the number of magnetic poles is four, the number of slots 113 is six and the number of segments 115 is eighteen.

In addition, a riser 116 folded to an outer diameter side is integrally formed with an end portion of the armature core 108 side of each of the segments 115. A terminal portion of the armature coil 109 is wound around the riser 116 and fixed thereto through fusing or the like. Accordingly, the segment 115 is electrically connected to the armature coil 109 corresponding thereto.

Further, a connecting wire 117 is wound around the riser 116 corresponding to the segments 115 having the same electric potential, and the connecting wire 117 is fixed to the riser 116 through fusing. The connecting wire 117 is configured to short-circuit the segments 115 having the same electric potential to be drawn between the commutator 110 and the armature core 108.

As shown in FIG. 11, the commutator 110 having the above-mentioned configuration faces the gear housing 123 of the speed reduction mechanism 104. The gear housing 123 is configured of a housing main body 142 formed in substantially a box shape having an opening portion 142a formed at one surface thereof through aluminum die-casting, and a bottom plate 143 formed of a resin and configured to close the opening portion 142a of the housing main body 142.

A gear group 141 of the speed reduction mechanism 104 is received in the housing main body 142. In addition, a brush-receiving portion 122 is integrally formed with the electric motor 102 side of the housing main body 142, and the commutator 110 of the electric motor 102 faces the brush-receiving portion 122.

The brush-receiving portion 122 is formed in a concave shape at the electric motor 102 side of the gear housing 123. A holder stay 134 is installed inside the brush-receiving portion 122. A plurality of brush holders (not shown) are installed at the holder stay 134, and the brushes 121 are received to protrude from and retract into the brush holders. The brush 121 is configured to supply power from an external power supply (for example, a battery or the like mounted in an automobile) to the commutator 110. The brush 121 is biased toward the commutator 110 by a spring (not shown), and has a front end that comes in sliding contact with the segments 115.

(Method of Forming Armature Coil)

Next, an example of a method of forming the armature coil 109 will be described based on FIG. 14.

Figure 14:
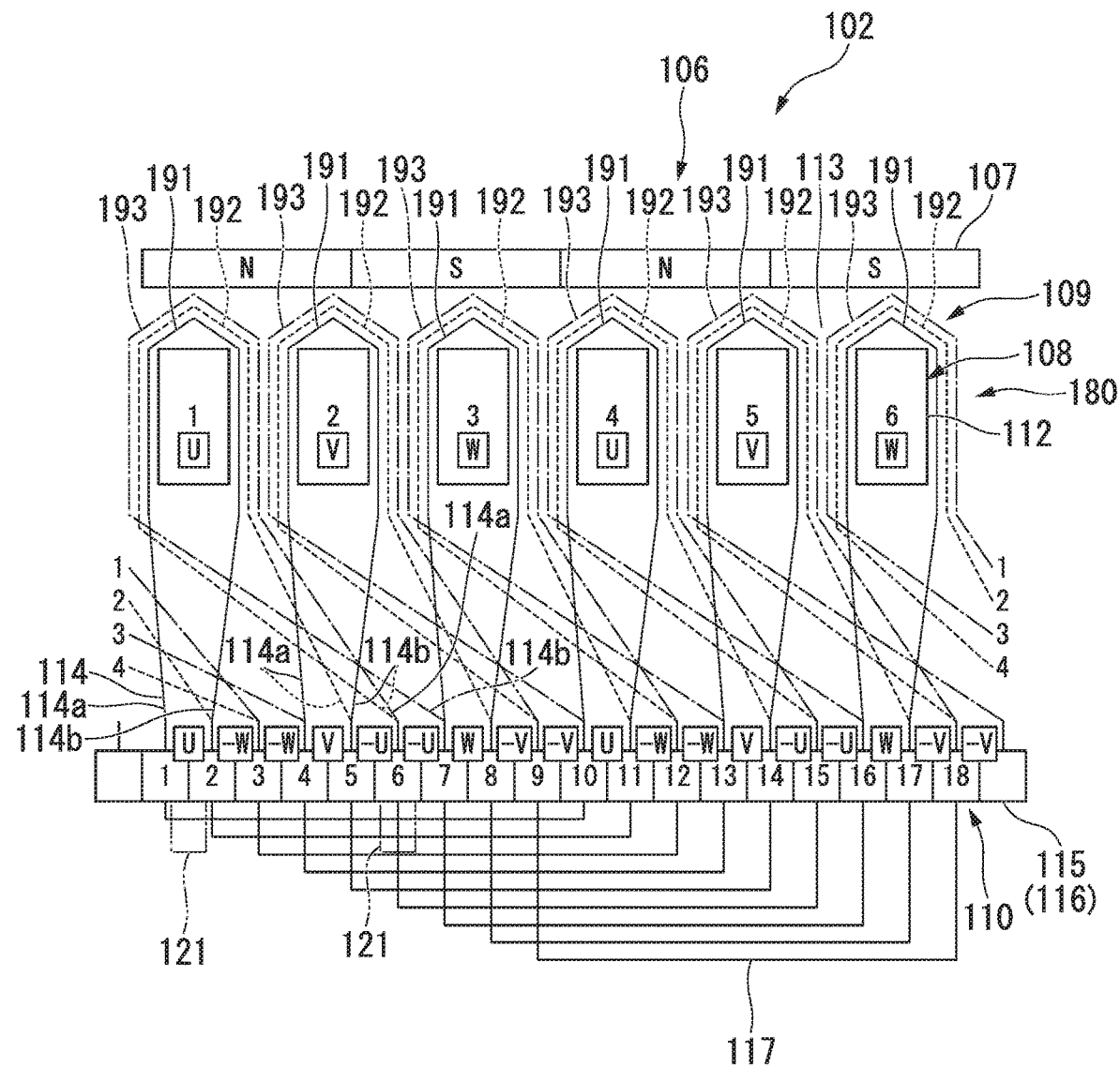
FIG. 14 is a development view of the armature according to the fourth embodiment of the present invention.

FIG. 14 is a development view of the armature, and a gap between the neighboring teeth forms a slot. Further, in description of FIG. 14, the segments 115, the teeth 112, and the formed armature coils 109 are designated by reference numerals.

As shown in FIG. 14, in the teeth 112, the U phase, the V phase and the W phase are sequentially allocated in the circumferential direction in this order. That is, the first and fourth teeth 112 are the U phase, the second and fifth teeth 112 are the V phase, and the third and sixth teeth 112 are the W phase. Here, in reference numerals designated to the segments 115, a position corresponding to No. 1 is a position corresponding to the first tooth 112.

Further, in FIG. 14, the clockwise winding direction of the wire 114 on the teeth 112 is hereinafter referred to as "forward", and the counterclockwise winding direction is hereinafter referred to as "reverse".

First, for example, after winding of a winding starting end 114a of the wire 114 starts on the first segments 115, the wire 114 is pulled into the slot 113 between the first and sixth teeth 112 in the vicinity of the first segment 115. Then, when the wire 114 is wound on each of the teeth 112 n (n is a natural number, multiples of 3), the wire 114 is wound forward on the first tooth 112 n/3 times through the concentrated winding method.

Next, the wire 114 is pulled out of the slot 113 between the first and second teeth 112 and wound around the riser 116 of the second segments 115 adjacent to the first segment 115. Then, a winding terminating end 114b is connected to the second segment 115. Accordingly, a first coil 191 of a U phase wound forward on the first tooth 112 is formed between the first and second segments 115.

In addition, the wire 114 having the winding starting end 114a wound around the riser 116 of the fifth segment 115 is pulled into the slot 113 between the first and second teeth 112. Then, the wire 114 is wound in reverse on the first tooth 112 n/3 times through the concentrated winding method.

Next, the wire 114 is pulled out of the slot 113 between the first and sixth teeth 112, and wound around the riser 116 of the sixth segment 115 adjacent to the fifth segment 115. Then, the winding terminating end 114b is connected to the sixth segment 115. Accordingly, a second coil 192 of a "−U" phase wound in reverse on the first tooth 112 is formed between the fifth and sixth segments 115.

Further, the wire 114 having the winding starting end 114a wound around the riser 116 of the sixth segment 115 is pulled into the slot 113 between the first and second teeth 112. Then, the wire 114 is wound in reverse on the first tooth 112 n/3 times through the concentrated winding method.

Next, the wire 114 is pulled out of the slot 113 between the first and sixth teeth 112 and wound around the riser 116 of the seventh segment 115 adjacent to the sixth segment 115. Then, the winding terminating end 114b is connected to the seventh segment 115. Accordingly, a third coil 193 of a "−U" phase wound in reverse on the first tooth 112 is formed between the sixth and seventh segments 115.

Accordingly, the armature coil 109 wound by n turns and configured of the first coil 191 of the U phase in which the wire 114 is wound forward n/3 times, and the second coil 192 of the "−U" phase and the third coil 193 of the "−U" phase in which the wire 114 is wound in reverse n/3 times is formed at the first tooth 112 corresponding to the U phase.

Then, as these are sequentially performed between the segments 115 corresponding to the phases, the armature coil 109 having a 3-phase structure including the first coil 191, the second coil 192 and the third coil 193 is formed at the armature core 108, and the coils 191 to 193 having the U, "−W," "−W," V, "−U," "−U," W, "−V" and "−V" phases are electrically connected in sequence between the neighboring segments 115.

Further, places at which the winding starting end 114a and the winding terminating end 114b of the wire 114 forming the coils 191 to 193 of the phases connect to the segments 115 may be disposed such that the coils 191 to 193 of the U, "−W," "−W," V, "−U," "−U," W, "−V" and "−V" phases may be electrically connected between the neighboring segments 115 in this order.

Here, the insulators 160 formed of a resin are mounted on the armature core 108 from both ends in the axial direction, and the wire 114 is wound from above the two insulators 160.

(Insulator)

Figure 15:
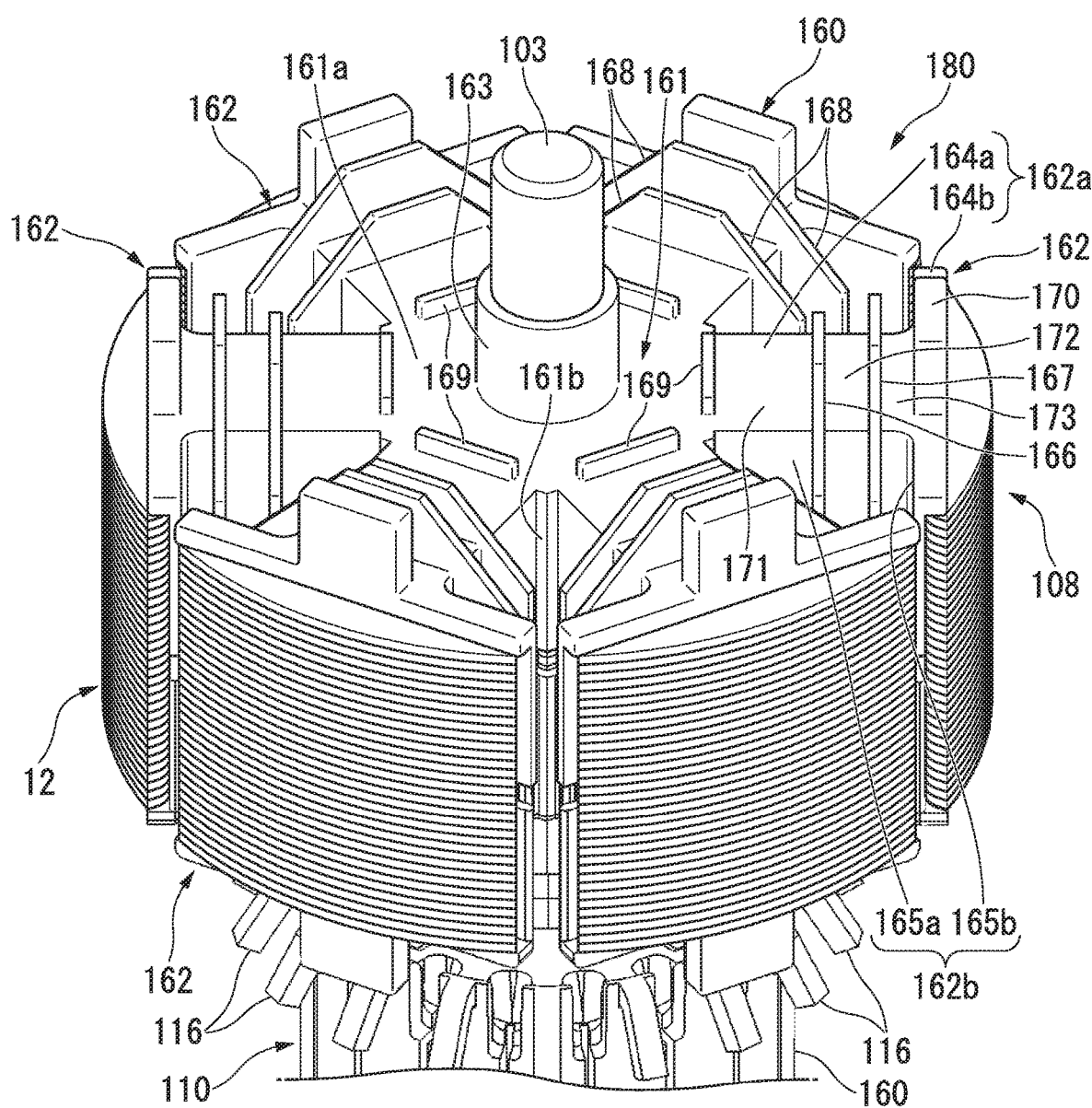
FIG. 15 is a perspective view showing a state in which an insulator is mounted on the armature core according to the fourth embodiment of the present invention.
Figure 16:
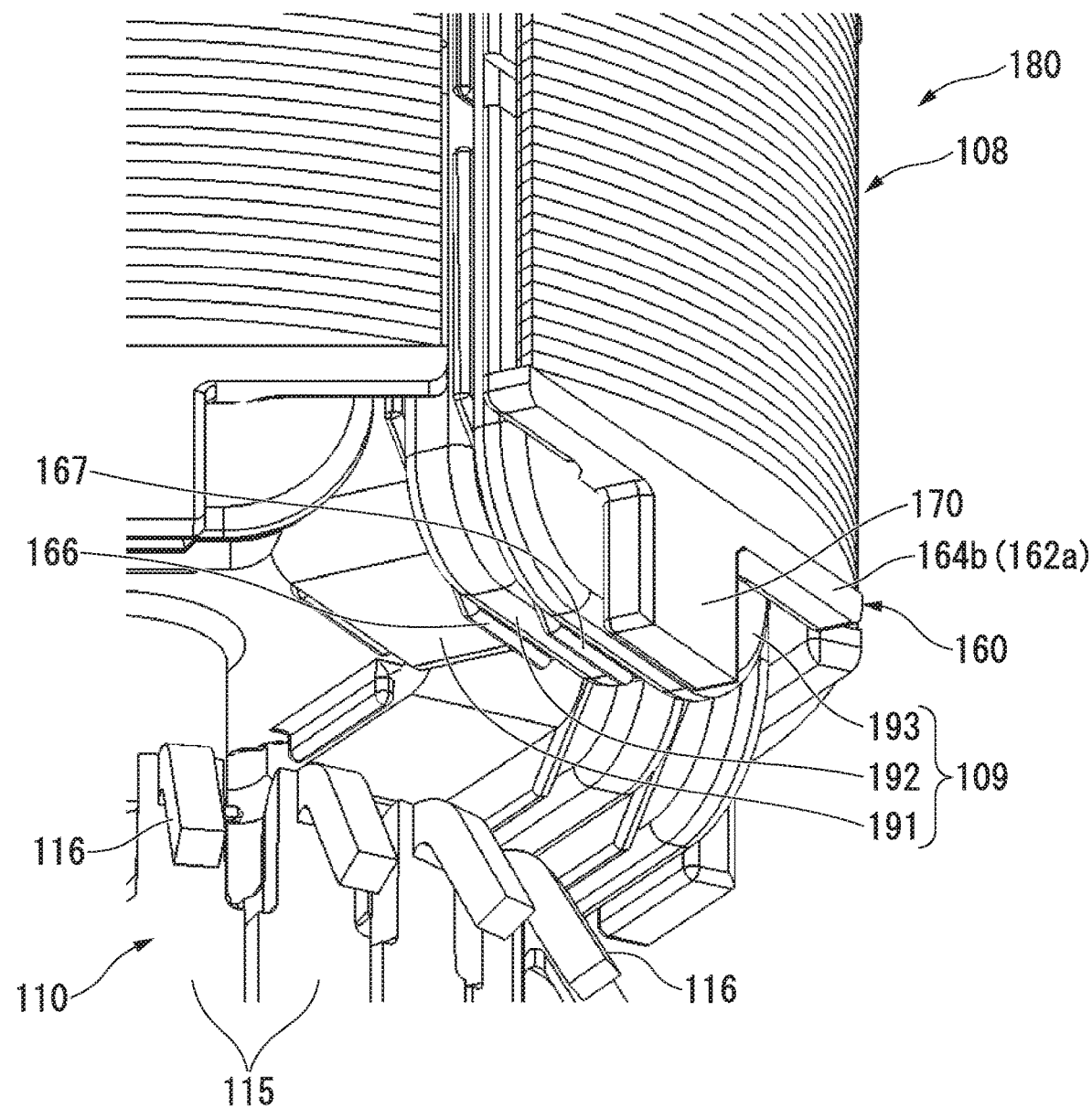
FIG. 16 is an enlarged perspective view of the insulator mounted on the armature core according to the fourth embodiment of the present invention when seen from the commutator side.
Figure 17:
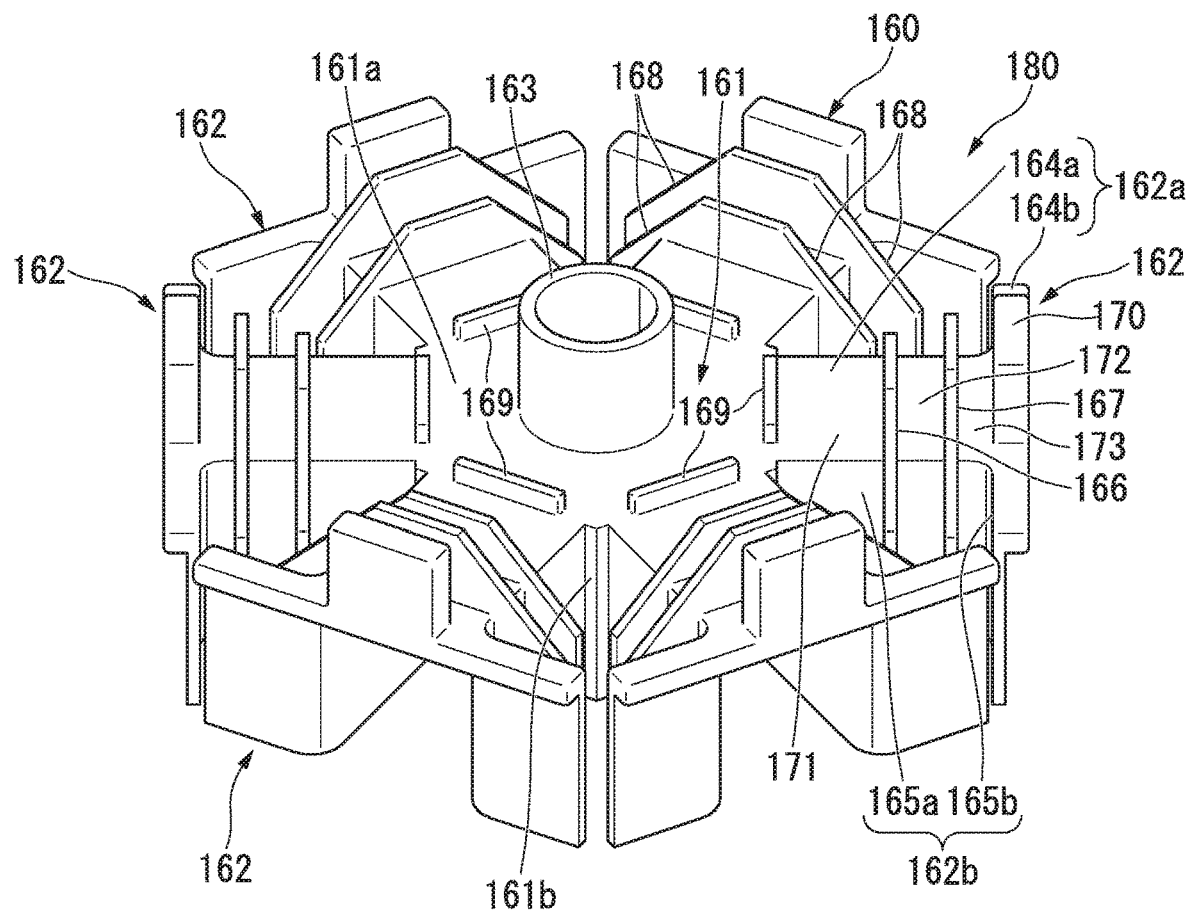
FIG. 17 is a perspective view of the insulator according to the fourth embodiment of the present invention.

FIG. 15 is a perspective view showing a state in which an insulator is mounted on the armature core, FIG. 16 is an enlarged perspective view of the insulator mounted on the armature core when seen from the commutator side, and FIG. 17 is a perspective view of the insulator.

As shown in FIGS. 15 to 17, the insulator 160 includes a core main body coating portion 161 configured to cover the core main body 111 of the armature core 108, and a tooth coating portion 162 configured to cover the teeth 112. The core main body coating portion 161 and the tooth coating portion 162 are integrally formed of an insulating material such as a resin or the like.

The core main body coating portion 161 has a main body coating portion end surface 161a configured to cover an end portion in the axial direction of the core main body 111, and a main body coating portion side surface 161b configured to cover an outer circumferential surface of the core main body 111. A substantially cylindrical shaft insertion portion 163 protrudes outward in the axial direction from a center in the radial direction of the main body coating portion end surface 161a. The rotation shaft 103 is inserted through the shaft insertion portion 163.

The main body coating portion side surface 161b extends from an outer circumferential edge portion of the main body coating portion end surface 161a to substantially a center in the axial direction of the armature core 108.

The tooth coating portion 162 has a tooth coating portion end surface 162a configured to cover an end portion in the axial direction of the teeth 112, and a tooth coating portion side surface 162b configured to cover side surfaces of the teeth 112.

The tooth coating portion end surface 162a is formed in substantially a T shape when seen in a plan view in the axial direction to correspond to shapes of the teeth 112. Specifically, the tooth coating portion end surface 162a has a winding drum coating portion end surface 164a configured to cover an end surface in the axial direction of the winding drum 112a of the teeth 112, and a flange coating portion end surface 164b configured to cover an end surface in the axial direction of the flange 112b, which are integrally formed with each other.

The tooth coating portion side surface 162b is formed in substantially an L-shaped cross section, and extends from side edges of the winding drum coating portion end surface 164a and side edges inside in the radial direction of the flange coating portion end surface 164b in the tooth coating portion end surface 162a to substantially a center in the axial direction of the armature core 108. More specifically, the tooth coating portion side surface 162b has a winding drum coating portion side surface 165a configured to cover side surfaces of the winding drum 112a of the teeth 112, and a flange coating portion side surface 165b configured to cover an inner surface in the radial direction of the flange 112b, which are integrally formed with each other.

Here, the two partition walls 166 and 167 of a first partition wall 166 and a second partition wall 167 having a plate shape are integrally formed with the tooth coating portion end surface 162a and the tooth coating portion side surface 162b throughout the entire circumference. Then, the first partition wall 166 is disposed at substantially a center in the radial direction of the tooth coating portion 162. Further, the second partition wall 167 is disposed at substantially a center between the first partition wall 166, and the flange coating portion end surface 164b and the flange coating portion side surface 165b. In addition, flat chamfering portions 168 are formed at corners of the partition walls 166 and 167.

Here, the two partition walls 166 and 167 are provided such that places of the tooth coating portion 162 on which the wire 114 is wound are divided into three chambers. Accordingly, three accommodating portions 171, 172 and 173 in which the three coils 191, 192 and 193 are accommodated are formed at the tooth coating portion 162.

That is, the first accommodating portion 171 of the three accommodating portions 171, 172 and 173 is formed inside in the radial direction of the first partition wall 166 of the tooth coating portion 162. Then, the first coil 191 is accommodated in the first accommodating portion 171. In addition, the second accommodating portion 172 of the three accommodating portions 171, 172 and 173 is formed between the first partition wall 166 and the second partition wall 167 of the tooth coating portion 162. Then, the second coil 192 is accommodated in the second accommodating portion 172. Further, the third accommodating portion 173 of the three accommodating portions 171, 172 and 173 is formed outside in the radial direction of the second partition wall 167 of the tooth coating portion 162. Then, the third coil 193 is accommodated in the third accommodating portion 173.

In this way, the three coils 191, 192 and 193 are accommodated in the three accommodating portions 171, 172 and 173 inside in the radial direction in sequence in which the coils are formed. That is, first, the wire 114 is wound on the first accommodating portion 171 to form a first coil 181. Next, the wire 114 is wound on the second accommodating portion 172 to form a second coil 182. Next, the wire 114 is wound on the third accommodating portion 173 to form a third coil 183.

Here, since the flat chamfering portions 168 are formed at the corners of the partition walls 166 and 167, when the coils 191 to 193 are accommodated in the three accommodating portions 171, 172 and 173, winding workability of the wire 114 forming the coils 191 to 193 is improved. That is, winding work of the wire 114 can be smoothly performed by the flat chamfering portion 168 without hooking the wire 114 on the partition walls 166 and 167.

In addition, a winding collapse prevention plate 169 is integrally formed with a connecting portion of the winding drum coating portion end surface 164a of the tooth coating portion 162 and the main body coating portion end surface 161a of the core main body coating portion 161. The winding collapse prevention plate 169 is configured to prevent collapse of the first coil 191 accommodated in the first accommodating portion 171. The winding collapse prevention plate 169 also has a function of dividing the first accommodating portion 171.

Further, a winding collapse prevention convex portion 170 is integrally formed with the flange coating portion end surface 164b of the tooth coating portion 162 at substantially a center in the circumferential direction. The winding collapse prevention convex portion 170 is configured to prevent collapse of the third coil 193 accommodated in the third accommodating portion 173. The winding collapse prevention convex portion 170 also has a function of dividing the third accommodating portion 173.

Here, the partition walls 166 and 167, the winding collapse prevention plate 169 and the winding collapse prevention convex portion 170 are formed to satisfy the following relations.

Figure 18:
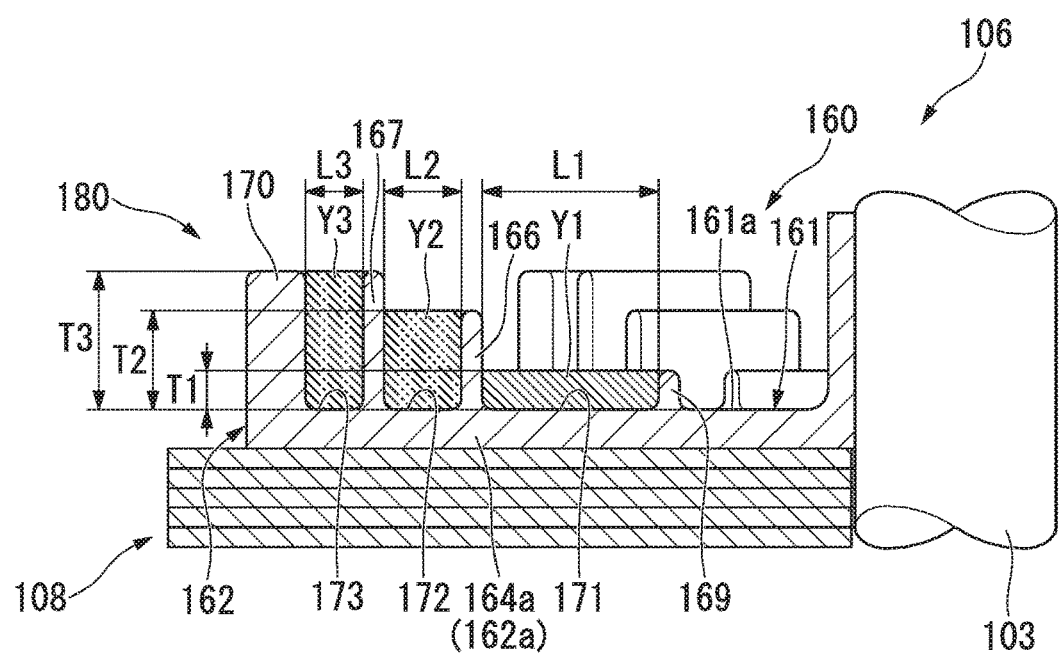
FIG. 18 is a view for describing relations between each partition wall, a winding collapse prevention plate and a winding collapse prevention convex portion according to the fourth embodiment of the present invention.

FIG. 18 is a view for describing relations between the partition wall, the winding collapse prevention plate and the winding collapse prevention convex portion.

That is, as shown in FIG. 18, when a height of the winding collapse prevention plate 169 is set as T1, a height of the first partition wall 166 is set as T2, and a height of the second partition wall 167 and a height of the winding collapse prevention convex portion 170 is set as T3, the heights T1, T2 and T3 are set to satisfy:

$$T1 \leq T2 \leq T3 \tag{1}$$

Further, when a distance between the winding collapse prevention plate 169 and the first partition wall 166 is set as L1, a distance between the first partition wall 166 and the second partition wall 167 is set as L2, and a distance between the second partition wall 167 and the winding collapse prevention convex portion 170 is set as L3, the distances L1, L2 and L3 are set to satisfy:

$$L1 \geq L2 \geq L3 \tag{2}$$

Then, when a capacity (see a portion hatched by solid lines) of the first accommodating portion 171 formed by the winding collapse prevention plate 169, the tooth coating portion 162 and the first partition wall 166 is set as Y1, a capacity (see a portion hatched by two-dot chain lines) of the second accommodating portion 172 formed by the first partition wall 166, the tooth coating portion 162 and the second partition wall 167 is set as Y2, and a capacity (see a portion hatched by chain lines) of the third accommodating portion 173 formed by the second partition wall 167, the tooth coating portion 162 and the winding collapse prevention convex portion 170 is set as Y3, the capacities Y1, Y2 and Y3 are set to satisfy:

$$Y1 \approx Y2 \approx Y3 \tag{3}$$

In order to satisfy equations (1) and (2), as the partition walls 166 and 167, the winding collapse prevention plate 169 and the winding collapse prevention convex portion 170 are formed, a wire height can be suppressed to a low level as the coils 191 to 193 are disposed inside in the radial direction. That is, the wire height of the first coil 191 of the three coils 191 to 193 is maximally reduced, and the wire height of the third coil 193 is maximally increased.

Here, as specifically shown in FIG. 13, since the teeth 112 radially extend from the armature core 108, a distance between the neighboring teeth 112 disposed inside in the radial direction is reduced. For this reason, as the wire height is suppressed to a low level as the coils 191 to 193 are disposed inside in the radial direction, contact between the neighboring coils 191 to 193 in the circumferential direction is avoided. In addition, as the capacity Y1 of the first accommodating portion 171, the capacity Y2 of the second accommodating portion 172 and the capacity Y3 of the third accommodating portion 173 satisfy equation (3), lengths of the wires 114 forming the three coils 191 to 193 can be uniformized.

(Speed Reduction Mechanism)

Returning to FIG. 11, the gear group 141 is received in the housing main body 142 of the gear housing 123 to which the electric motor 102 is attached. The gear group 141 is configured of a worm shaft 125 connected to the rotation shaft 103 of the electric motor 102, a stepped gear 126 meshed with the worm shaft 125, and a spur gear 127 meshed with the stepped gear 126.

The worm shaft 125 has one end connected to the rotation shaft 103 and the other end rotatably and axially supported by the housing main body 142. A connecting portion 124 of the worm shaft 125 and the rotation shaft 103, i.e., the other end of the rotation shaft 103, is rotatably supported by a roll bearing 132 installed at the housing main body 142.

An output shaft 128 is installed at the spur gear 127, and a front end of the output shaft 128 protrudes from the housing main body 142. In addition, a tapered portion 129 is formed at the front end of the output shaft 128, and further, a serration 130 is formed at the tapered portion 129. For example, the serration 130 is used to connect an external mechanism configured to drive a wiper or the like to the output shaft 128.

(Operation of Electric Motor)

Next, an operation of the electric motor 102 will be described based on FIG. 14.

In description of the operation of the electric motor 102, for example, as shown in FIG. 14, the case in which the brush 121 is disposed between the first and second segments 115, the brush 121 is disposed at the sixth segment 115, and a voltage is applied between the two brushes 121 will be described.

In this case, the first coil 191 of the U phase is short-circuited. Then, a reverse current (counterclockwise in FIG. 14) flows through the second coil 192 of the "–U" phase, and a forward current (clockwise in FIG. 14) flows through the third coil 193 of the "–U" phase. That is, since currents in opposite directions flow through the second coil 192 and the third coil 193, the magnetic fields are offset and no torque is generated between the coils and the magnets 107.

On the other hand, forward currents flow through the first coil 191 of the V phase, the second coil 192 of the "–V" phase and the third coil 193 of the "–V" phase. In addition, reverse currents flow through the first coil 191 of the "–W" phase, the second coil 192 of the "–W" phase and the third coil 193 of the "–W" phase.

Then, the magnetic fields are formed at the second, third, fifth and sixth teeth 112. Directions of the magnetic fields are provided in sequence in the circumferential direction. For this reason, the magnetic attractive force or repulsive force is applied between the magnetic field formed at each of the teeth 112 and the magnet 107 about the rotation shaft 103 at the point-symmetrical positions in the same direction. Then, the rotation shaft 103 is rotated accordingly.

Further, for example, in the description of the operation of the above-mentioned electric motor 102, the brush 121 disposed between the first and second segments 115 is angularly advanced, and the rotation shaft 103 can also be rapidly rotated.

(Effects)

Accordingly, according to the above-mentioned fourth embodiment, since the first partition wall 166 and the second partition wall 167 are installed at the tooth coating portion 162 of the insulator 160 mounted on the armature core 108 to form the three accommodating portions 171, 172 and 173 as the wire 114 is formed at the armature core 108 to form the armature coil 109, places at which the three coils 191 to 193 that constitute the armature coil 109 are disposed can be divided. For this reason, as a winding work of the wire 114 can be easily performed, thickening of the winding of the wire 114 can also be reduced.

In addition, the three coils 191 to 193 are accommodated in the three accommodating portions 171, 172 and 173 inside in the radial direction according to the sequence in which the three coils are formed. That is, first, the wire 114 is wound on the first accommodating portion 171 to form the first coil 181. Next, the wire 114 is wound on the second accommodating portion 172 to form the second coil 182. Next, the wire 114 is wound on the third accommodating portion 173 to form the third coil 183. For this reason, in comparison with the case in which the wire 114 is sequentially wound from the distal end of the teeth 112, the coils 191 to 193 can be smoothly formed on the teeth 112. Thus, the wire 114 can be prevented from becoming bulky, and thickening of the winding of the wire 114 can be securely reduced.

Further, since the flat chamfering portions 168 are formed at corners of the partition walls 166 and 167, when the coils 191 to 193 are accommodated in the three accommodating portions 171, 172 and 173, winding workability of the wire 114 forming the coils 191 to 193 can be improved. That is, the winding work of the wire 114 can be more smoothly performed without the wire 114 hooking on the partition walls 166 and 167 by the flat chamfering portions 168.

In addition, the two partition walls 166 and 167 of the first partition wall 166 and the second partition wall 167 are integrally formed with the tooth coating portion end surface 162a and the tooth coating portion side surface 162b throughout the entire circumference. For this reason, places at which the three coils 191 to 193 are disposed can be securely divided, the winding workability of the wire 114 can be more easily performed, and thickening of the winding of the wire 114 can also be securely reduced.

Further, since the winding collapse prevention plate 169 is integrally formed with the connecting portion of the winding drum coating portion end surface 164a of the tooth coating portion 162 and the main body coating portion end surface 161a of the core main body coating portion 161, collapse of the first coil 191 accommodated in the first accommodating portion 171 can be securely prevented. In addition, since the winding collapse prevention convex portion 170 is integrally formed with the flange coating portion end surface 164b of the tooth coating portion 162 at substantially a center in the circumferential direction, collapse of the third coil 193 accommodated in the third accommodating portion 173 can be prevented.

In addition, since the partition walls 166 and 167, the winding collapse prevention plate 169 and the winding collapse prevention convex portion 170 are formed to satisfy equations (1) to (3), a wire height of the first coil 191 of the three coils 191 to 193 can be maximally reduced, and a wire height of the third coil 193 can be maximally increased.

For this reason, the wire 114 can be efficiently wound on the teeth 112 while avoiding contact between the coils 191 to 193 neighboring in the circumferential direction. Thus, a space factor of the wire 114 can be improved. Further, the lengths of the wires 114 forming the three coils 191 to 193 can be uniformized, and characteristics of the electric motor 102 can be stabilized.

Further, in the above-mentioned fourth embodiment, the case in which the winding collapse prevention plate 169 is integrally formed with the connecting portion of the winding drum coating portion end surface 164a of the tooth coating portion 162 and the main body coating portion end surface 161a of the core main body coating portion 161 has been described.

In addition, in the above-mentioned fourth embodiment, the case in which the two partition walls 166 and 167 of the first partition wall 166 and the second partition wall 167 are integrally formed with the tooth coating portion end surface 162a and the tooth coating portion side surface 162b throughout the entire circumference.

However, the present invention is not limited thereto, but for example, may be configured like the following modified examples.

First Modified Example

Figure 19:
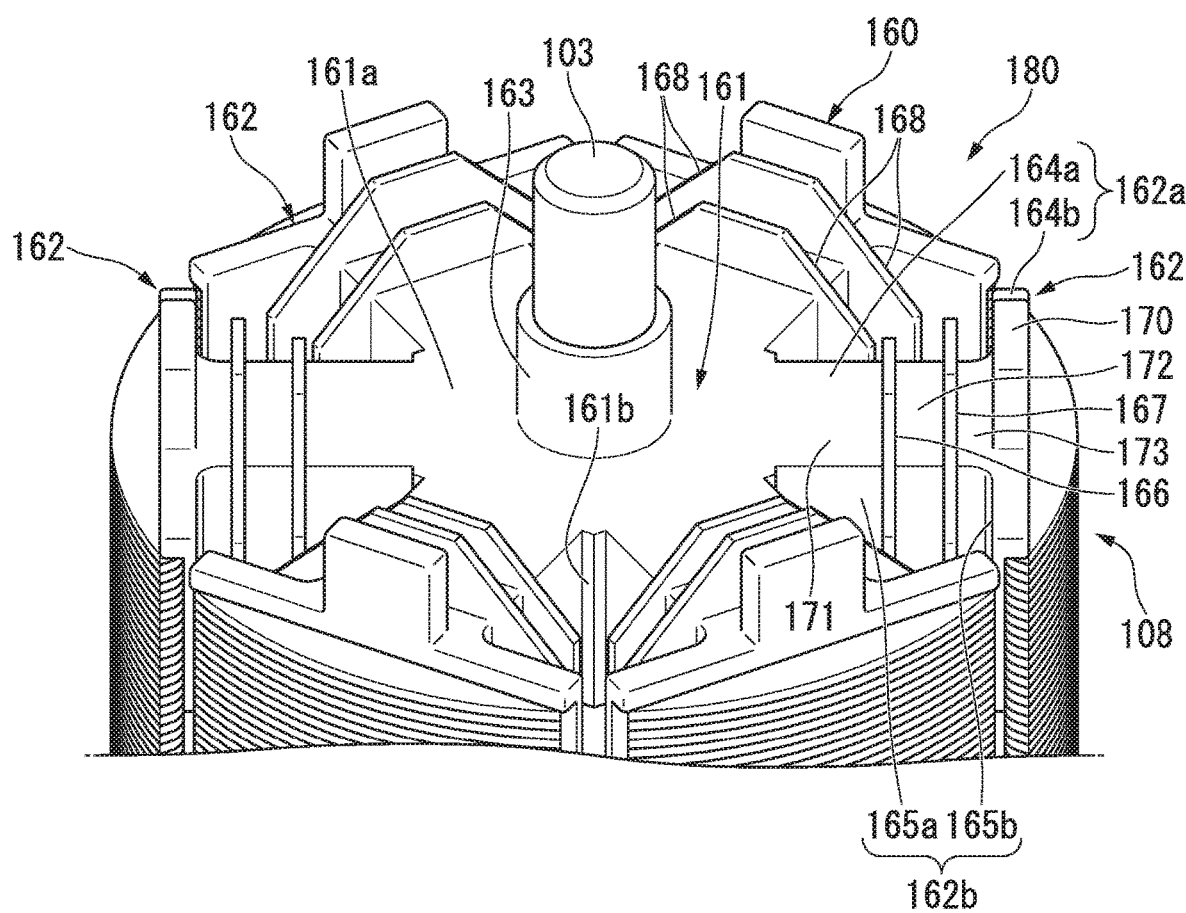
FIG. 19 is a perspective view showing a state in which an insulator is mounted on an armature core according to a first modified example of the fourth embodiment of the present invention.

FIG. 19 is a perspective view of a state in which an insulator is mounted on an armature core according to a first modified example of the fourth embodiment.

As shown in FIG. 19, the above-mentioned fourth embodiment and the first modified example differ in that, in the insulator 160 of the above-mentioned fourth embodiment, while the winding collapse prevention plate 169 is integrally formed with the connecting portion of the winding drum coating portion end surface 164a of the tooth coating portion 162 and the main body coating portion end surface 161a of the core main body coating portion 161, in the first modified example, the winding collapse prevention plate 169 is not integrally formed therewith.

The first accommodating portion 171 is disposed at the most inside portion in the radial direction of the three accommodating portions 171, 172 and 173. That is, the first accommodating portion 171 is formed at a root of the tooth 112, and collapse of the first coil 191 accommodated in the first accommodating portion 171 is suppressed by the first partition wall 166 and the main body coating portion side surface 161b.

Accordingly, even with the configuration of the first modified example, the same effect as in the above-mentioned fourth embodiment can be obtained.

Second Modified Example

Figure 20:
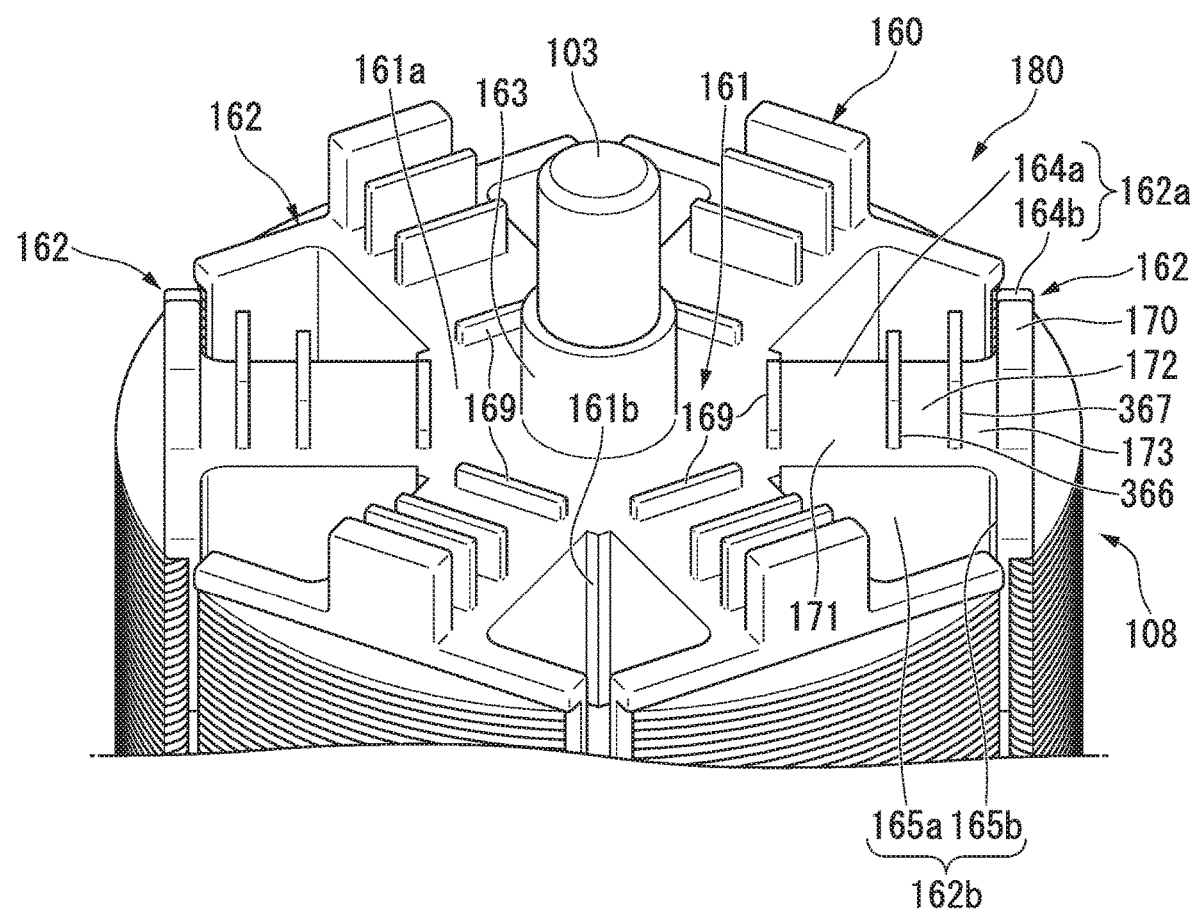
FIG. 20 is a perspective view showing a state in which an insulator is mounted on an armature core according to a second modified example of the fourth embodiment of the present invention.

FIG. 20 is a perspective view of a state in which an insulator is mounted on an armature core according to a second modified example of the fourth embodiment.

As shown in FIG. 20, the above-mentioned fourth embodiment and the second modified example differ in that, in the fourth embodiment, while the first partition wall 166 and the second partition wall 167 are integrally formed with the tooth coating portion end surface 162a and the tooth coating portion side surface 162b throughout the entire circumference, in the second modified example, a first partition wall 366 and a second partition wall 367 having plate shapes are formed at only the tooth coating portion end surface 162a.

Even with the above-mentioned configuration, places at which the coils 191 to 193 are disposed can be divided. For this reason, the same effect as in the above-mentioned fourth embodiment can be exhibited.

Third Modified Example

Figure 21:
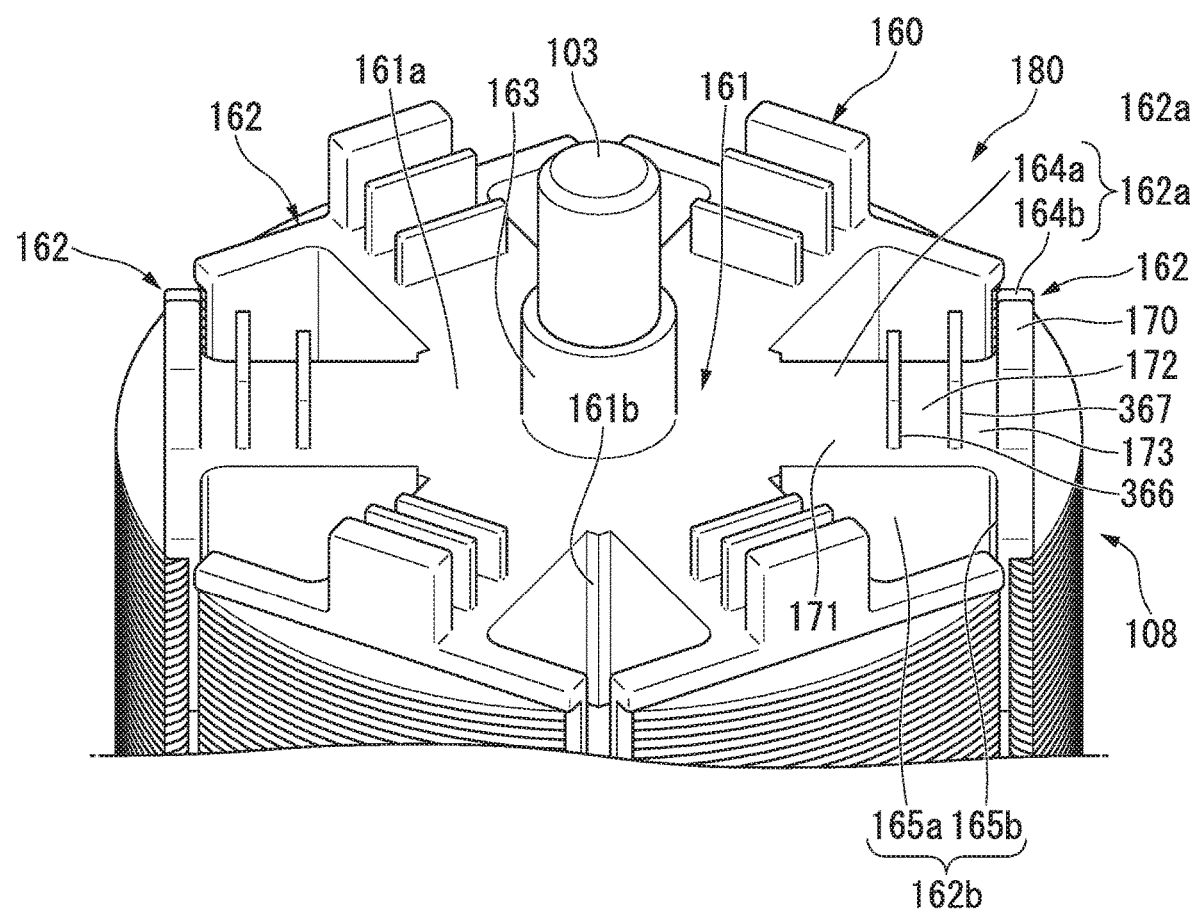
FIG. 21 is a perspective view showing a state in which an insulator is mounted on an armature core according to a third modified example of the fourth embodiment of the present invention.

FIG. 21 is a perspective view of a state in which an insulator is mounted on an armature core according to a third modified example of the fourth embodiment.

As shown in FIG. 21, the second modified example and the third modified example differ in that, in the above-mentioned second modified example, while the winding collapse prevention plate 169 is integrally formed with the connecting portion of the winding drum coating portion end surface 164a of the tooth coating portion 162 and the main body coating portion end surface 161a of the core main body coating portion 161, in the third modified example, the winding collapse prevention plate 169 is not integrally formed therewith.

Here, as described in the first modified example, the first accommodating portion 171 partitioned by the winding collapse prevention plate 169 is disposed at a root of the tooth 112. For this reason, the first coil 191 accommodated in the first accommodating portion 171 suppresses the collapse by the first partition wall 166 and the main body coating portion side surface 161b.

Accordingly, even with the configuration of the third modified example, the same effect as in the above-mentioned second modified example can be exhibited.

Fifth Embodiment

Next, a fifth embodiment of the present invention will be described based on FIGS. 22 to 24. Further, the same elements as in the fourth embodiment will be described with the same reference numerals.

Figure 22:
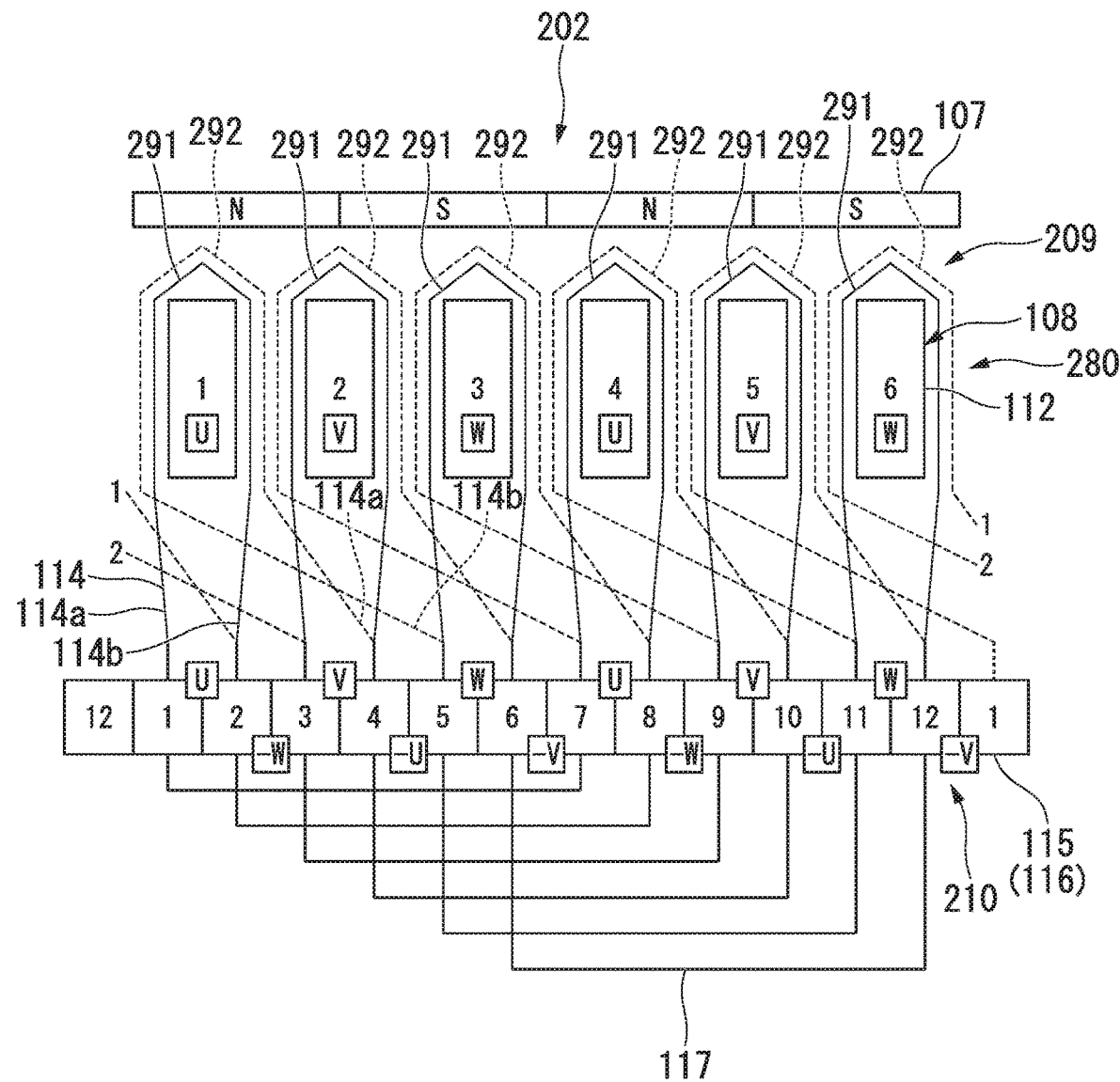
FIG. 22 is a development view of an armature according to a fifth embodiment of the present invention.

FIG. 22 is a development view of the armature according to the fifth embodiment.

As shown FIG. 22, the fourth embodiment and the fifth embodiment differ in that, while the eighteen segments 115 are attached to the commutator 110 of the fourth embodiment, twelve segments 115 are attached to a commutator 210 of the fifth embodiment. That is, an electric motor 202 of the fifth embodiment is configured of a four-pole six-slot twelve-segment electric motor in which the number of magnetic poles is set to 4, the number of slots 113 is set to 6, and the number of segments 115 is set to 12.

In addition, while the armature coil 109 having a three-phase structure including the three coils 191 to 193 of the first coil 191, the second coil 192 and the third coil 193 is formed at the armature core 108 configuring the armature 180 of the fourth embodiment, an armature coil 209 having a three-phase structure including the two coils 291 and 292 of a first coil 291 and a second coil 292 is formed at the armature core 108 configuring an armature 280 of the fifth embodiment.

Further, a shape of an insulator 260 configured to insulate the armature coil 209 and the armature core 108 is distinguished from the shape of the insulator 160 of the fourth embodiment as a shape of the armature coil 209 is varied.

This will be more specifically described below.
(Method of Forming Armature Coil)

First, an example of a method of forming the armature coil 209 according to the fifth embodiment will be described based on FIG. 22.

As shown in FIG. 22, the teeth 112 are allocated of the U phase, the V phase and the W phase in the circumferential direction in this order. That is, the first and fourth teeth 112 have the U phase, the second and fifth teeth 112 have the V phase, and the third and sixth teeth 112 have the W phase.

Here, a position corresponding to No. 1 of the numbers designated to the segments 115 is a position corresponding to the first tooth 112. In addition, the segments 115 having the same electric potential are short-circuited by the connecting wire 117.

Further, in FIG. 22, a clockwise winding direction of the wire 114 on the teeth 112 is referred to as forward, and a counterclockwise winding direction is referred to as reverse.

First, for example, after winding of the winding starting end 114a of the wire 114 on the first segments 115 starts, the wire 114 is pulled into the slot 113 between the first and sixth teeth 112 adjacent to the first segments 115. Then, when the wire 114 is wound on each of the teeth 112 n (n is a natural number, multiples of 2), the wire 114 is wound forward on the first tooth 112 $n/2$ times through the concentrated winding method.

Next, the wire 114 is pulled out of the slot 113 between the first and second teeth 112, and wound around the riser 116 of the second segments 115 adjacent to the first segment 115. Then, the winding terminating end 114b is connected to the second segments 115. Accordingly, the first coil 291 of the U phase wound forward on the first tooth 112 is formed between the first and second segments 115.

In addition, the wire 114 having the winding starting end 114a wound around the riser 116 of the fourth segments 115 is pulled into the slot 113 between the first and second teeth 112. Then, the wire 114 is wound in reverse on the first tooth 112 $n/2$ times through the concentrated winding method.

Next, the wire 114 is pulled out of the slot 113 between the first and sixth teeth 112, and wound around the riser 116 of the fifth segments 115 adjacent to the fourth segments 115. Then, the winding terminating end 114b is connected to the fifth segments 115. Accordingly, the second coil 292 of the "−U" phase wound in reverse on the first tooth 112 is formed between the fourth and fifth segments 115.

Accordingly, the armature coil 209 wound n times and configured of the first coil 191 of the U phase on which the wire 114 is wound forward n/2 times and the second coil 192 of the "−U" phase on which the wire 114 is wound in reverse n/2 times is formed at the first tooth 112 corresponding to the U phase.

Then, as these are sequentially performed between the segments 115 corresponding to the phases, the armature coil 209 of the three-phase structure including the first coil 291 and the second coil 292 is formed at the armature core 108, and the coils 291 and 292 of the U, "−W," V, "−U," W and "−V" phases are electrically connected between the neighboring segments 115 in this order.

Further, places at which the winding starting end 114a and the winding terminating end 114b of the wire 114 forming the coils 291 and 292 of the phases are connected to the segments 115 may be provided such that the coils 291 and 292 of the U, "−W," V, "−U," W and "−V" phases are electrically connected between the neighboring segments 115 in this order.

(Insulator)

Figure 23:
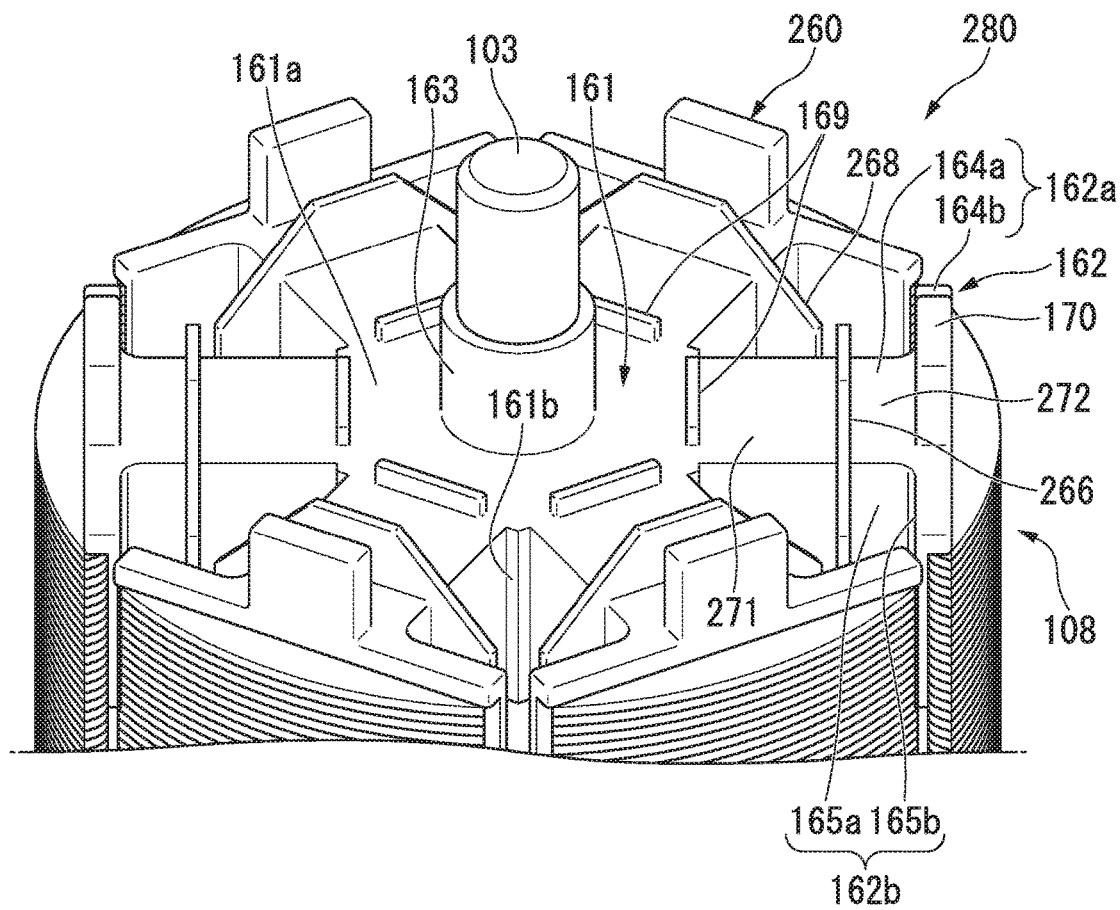
FIG. 23 is a perspective view showing a state in which an insulator is mounted on the armature core according to the fifth embodiment of the present invention.

FIG. 23 is a perspective view of a state in which the insulator is mounted on the armature core.

As shown in FIG. 23, the insulator 260 includes the core main body coating portion 161 configured to cover the core main body 111 of the armature core 108, and the tooth coating portion 162 configured to cover the teeth 112. The core main body coating portion 161 and the tooth coating portion 162 are integrally formed of an insulating material such as a resin or the like.

Here, in the fourth embodiment, the two partition walls 166 and 167 are integrally formed with the tooth coating portion end surface 162a and the tooth coating portion side surface 162b of the tooth coating portion 162 throughout the entire circumference. However, in the fifth embodiment, only one partition wall 266 is integrally formed with the tooth coating portion end surface 162a and the tooth coating portion side surface 162b of the tooth coating portion 162 throughout the entire circumference.

The partition wall 266 is formed in a plate shape, and disposed slightly outside in the radial direction with respect to substantially a center in the radial direction of the tooth coating portion 162. In addition, flat chamfering portions 268 are formed at corners of the partition wall 266.

As the partition walls 266 are formed at the tooth coating portion end surface 162a and the tooth coating portion side surface 162b, a place at which the wire 114 of the tooth coating portion 162 is wound is divided into two chambers. Accordingly, two accommodating portions 271 and 272 in which the two coils 291 and 292 are accommodated are formed at the tooth coating portion 162.

That is, the first accommodating portion 271 of the two accommodating portions 271 and 272 is formed inside in the radial direction of the partition wall 266 of the tooth coating portion 162. Then, the first coil 291 is accommodated in the first accommodating portion 271. In addition, the second accommodating portion 272 of the two accommodating portions 271 is formed outside in the radial direction of the partition wall 266 of the tooth coating portion 162. Then, the second coil 292 is accommodated in the second accommodating portion 272.

In this way, the first coil 291 formed early in the sequence is accommodated in the first accommodating portion 271 disposed inside in the radial direction, and the second coil 292 formed late in the sequence is accommodated in the second accommodating portion 272 disposed outside in the radial direction.

Here, since the flat chamfering portions 268 are formed at the corners of the partition wall 266, when the coils 291 and 292 are accommodated in the accommodating portions 271 and 272, winding workability of the wire 114 forming the coils 291 and 292 is improved.

In addition, the winding collapse prevention plate 169 is integrally formed with the connecting portion of the winding drum coating portion end surface 164a of the tooth coating portion 162 and the main body coating portion end surface 161a of the core main body coating portion 161. Further, the winding collapse prevention convex portion 170 is integrally formed with the flange coating portion end surface 164b of the tooth coating portion 162 at substantially a center in the circumferential direction.

Here, the partition wall 266, the winding collapse prevention plate 169 and the winding collapse prevention convex portion 170 are formed to satisfy the following relation.

Figure 24:
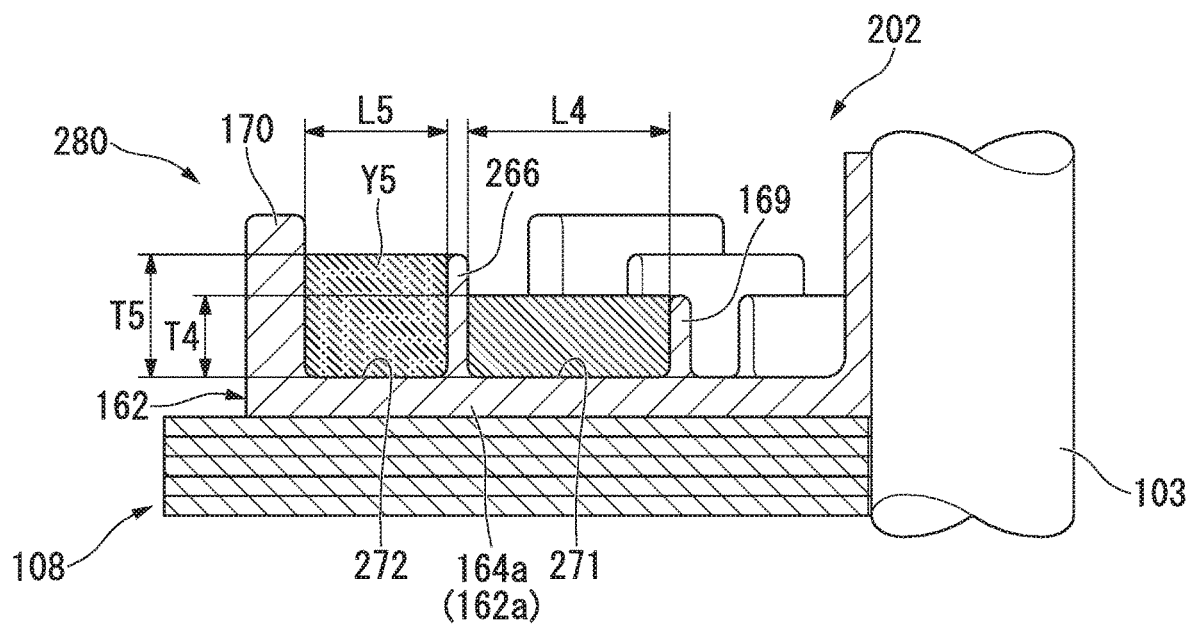
FIG. 24 is a view for describing relations between a partition wall, a winding collapse prevention plate and a winding collapse prevention convex portion according to the fifth embodiment of the present invention.

FIG. 24 is a view for describing relations between the partition wall, the winding collapse prevention plate and the winding collapse prevention convex portion.

That is, as shown in FIG. 24, when a height of the winding collapse prevention plate 169 is set as T4 and a height of the partition wall 266 is set as T5, the heights T4 and T5 satisfy the following equation:

$$T4 \leq T5 \qquad (4)$$

Further, when a distance between the winding collapse prevention plate 169 and the partition wall 266 is set as L4 and a distance between the partition wall 266 and the winding collapse prevention convex portion 170 is set as L5, the distances L4 and L5 satisfy the following equation:

$$L4 \geq L5 \qquad (5)$$

Then, when a capacity (see a portion hatched by solid lines) of the first accommodating portion 271 formed by the winding collapse prevention plate 169, the tooth coating portion 162 and the partition wall 266 is set as Y4 and a capacity (see a portion hatched by chain lines) of the second accommodating portion 272 formed by the partition wall 266, the tooth coating portion 162 and the winding collapse prevention convex portion 170 is set as Y5, the capacities Y4 and Y5 are set to satisfy the following equation:

$$Y4 \approx Y5 \qquad (6)$$

In order to satisfy equations (4) and (5), as the partition wall 266 and the winding collapse prevention plate 169 are formed, a wire height of the first coil 291 disposed inside in the radial direction can be suppressed to a low level. In addition, as the capacity Y4 of the first accommodating portion 271 and the capacity Y5 of the second accommodating portion 272 satisfy equation (6), lengths of the wires 114 forming the two coils 291 and 292 can be uniformized.

Accordingly, according to the above-mentioned fifth embodiment, even when the armature coil 209 is configured of the two coils 291 and 292, the same effect as in the above-mentioned fourth embodiment can be exhibited.

Further, in the above-mentioned fifth embodiment, the case in which the winding collapse prevention plate 169 is integrally formed with the connecting portion of the winding drum coating portion end surface 164a of the tooth coating portion 162 and the main body coating portion end surface 161a of the core main body coating portion 161 has been described.

In addition, in the above-mentioned fifth embodiment, the case in which the partition wall 266 is integrally formed with the tooth coating portion end surface 162a and the tooth coating portion side surface 162b throughout the entire circumference has been described.

However, the present invention is not limited thereto but, for example, may be configured as the following modified examples.

First Modified Example

Figure 25:
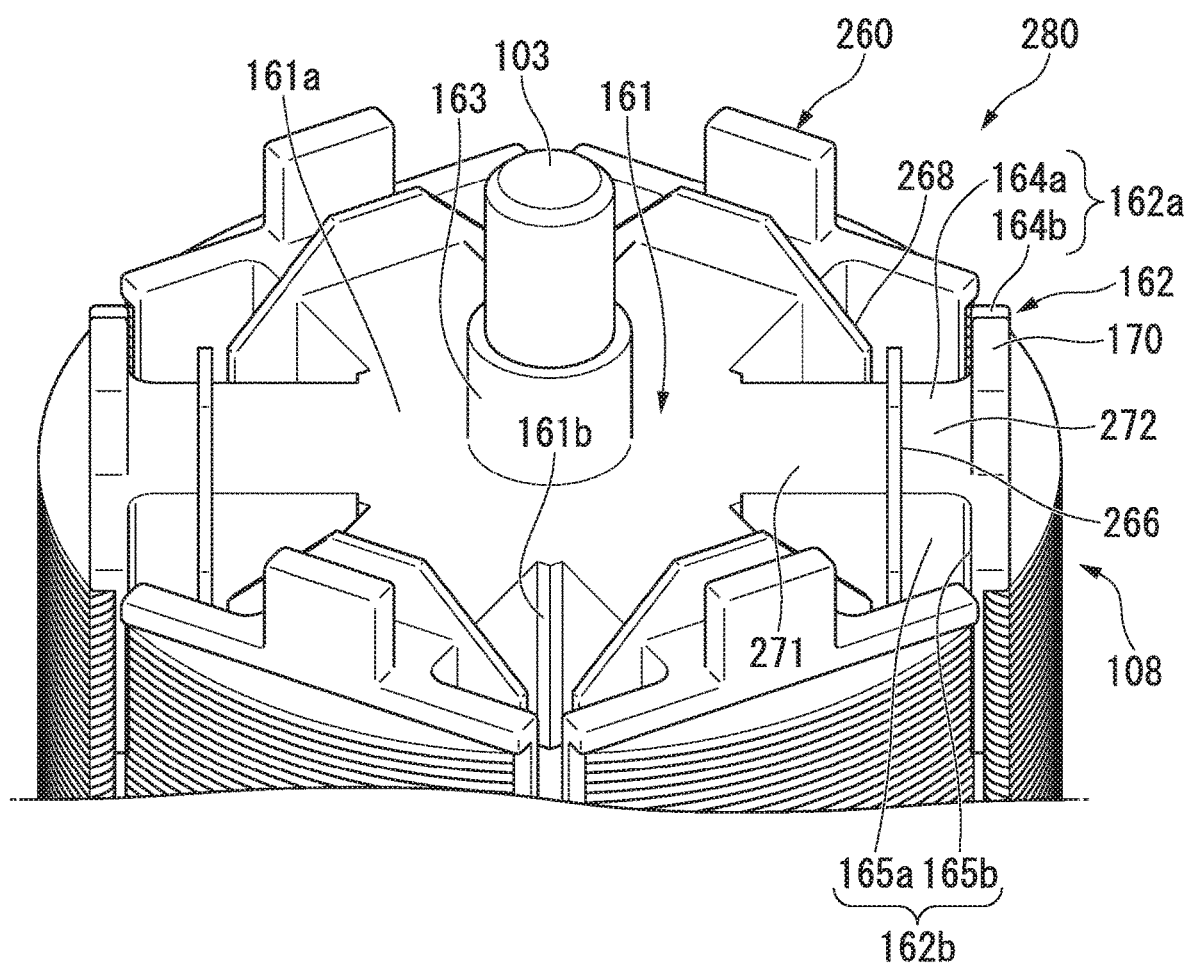
FIG. 25 is a perspective view showing a state in which an insulator is mounted on an armature core according to a first modified example of the fifth embodiment of the present invention.

FIG. 25 is a perspective view of a state in which an insulator is wound on an armature core according to a first modified example of the fifth embodiment.

As shown in FIG. 25, the above-mentioned fifth embodiment and the first modified example differ in that, in the insulator 260 of the above-mentioned fifth embodiment, while the winding collapse prevention plate 169 is integrally formed with the connecting portion of the winding drum coating portion end surface 164a of the tooth coating portion 162 and the main body coating portion end surface 161a of the core main body coating portion 161, in the first modified example, the winding collapse prevention plate 169 is not integrally formed therewith.

Here, the first accommodating portion 171 partitioned by the winding collapse prevention plate 169 is disposed at a root of the tooth 112. For this reason, in the first coil 291 accommodated in the first accommodating portion 171, collapse of the first coil 291 is suppressed by the first partition wall 166 and the main body coating portion side surface 161b.

Accordingly, even when the first modified example is configured as described above, the same effect as in the above-mentioned fifth embodiment can be exhibited.

Second Modified Example

Figure 26:
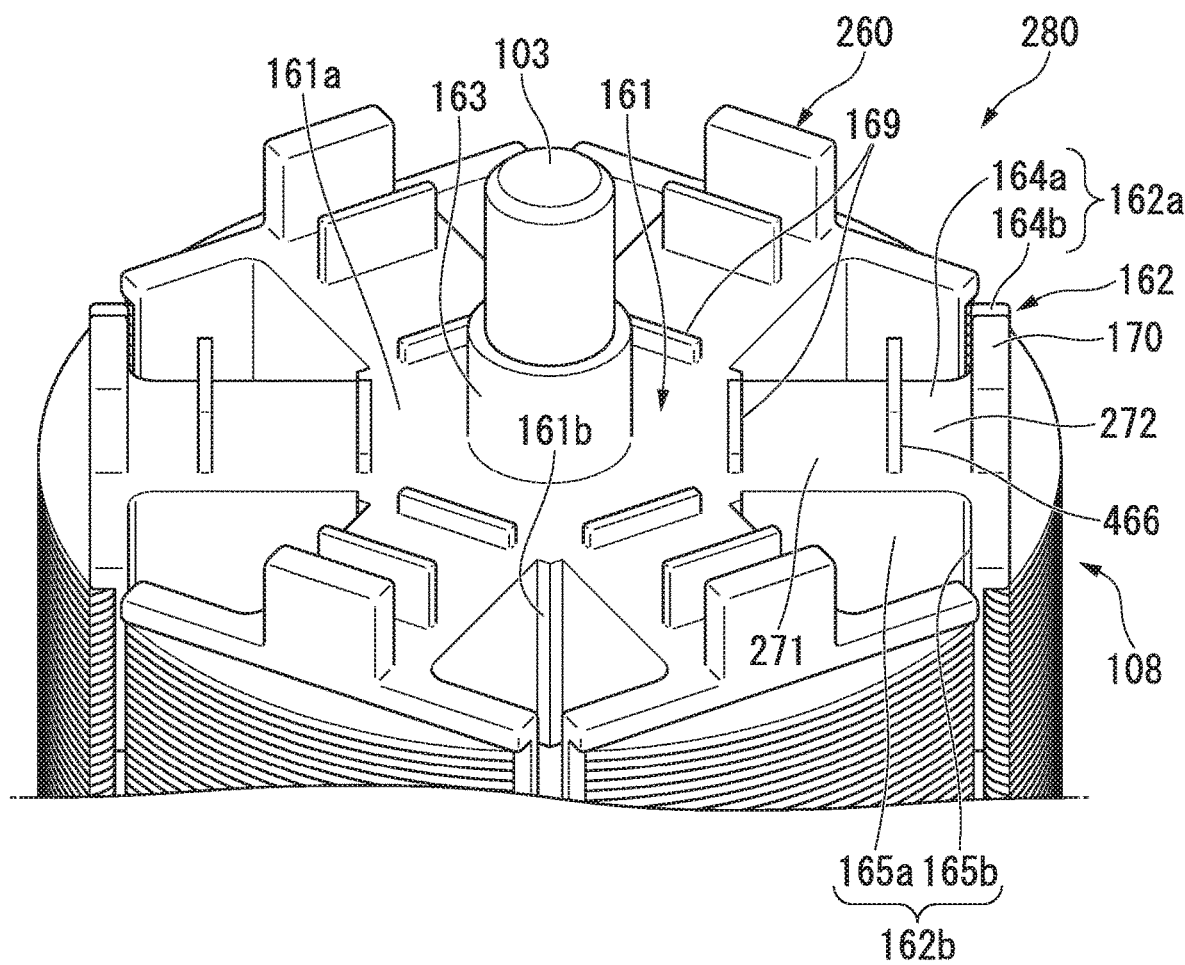
FIG. 26 is a perspective view showing a state in which an insulator is mounted on an armature core according to a second modified example of the fifth embodiment of the present invention.

FIG. 26 is a perspective view of a state in which an insulator is mounted on an armature core according to a second modified example of the fifth embodiment.

As shown in FIG. 26, the above-mentioned fifth embodiment and the second modified example differ in that, in the fifth embodiment, while the partition wall 266 is integrally formed with the tooth coating portion end surface 162a and the tooth coating portion side surface 162b throughout the entire circumference, in the second modified example, a partition wall 466 having a plate shape is formed at only the tooth coating portion end surface 162a.

Even when the above-mentioned configuration is provided, places at which the two coils 291 and 292 are disposed can be divided. For this reason, the same effect as in the above-mentioned fifth embodiment can be exhibited.

Third Modified Example

Figure 27:
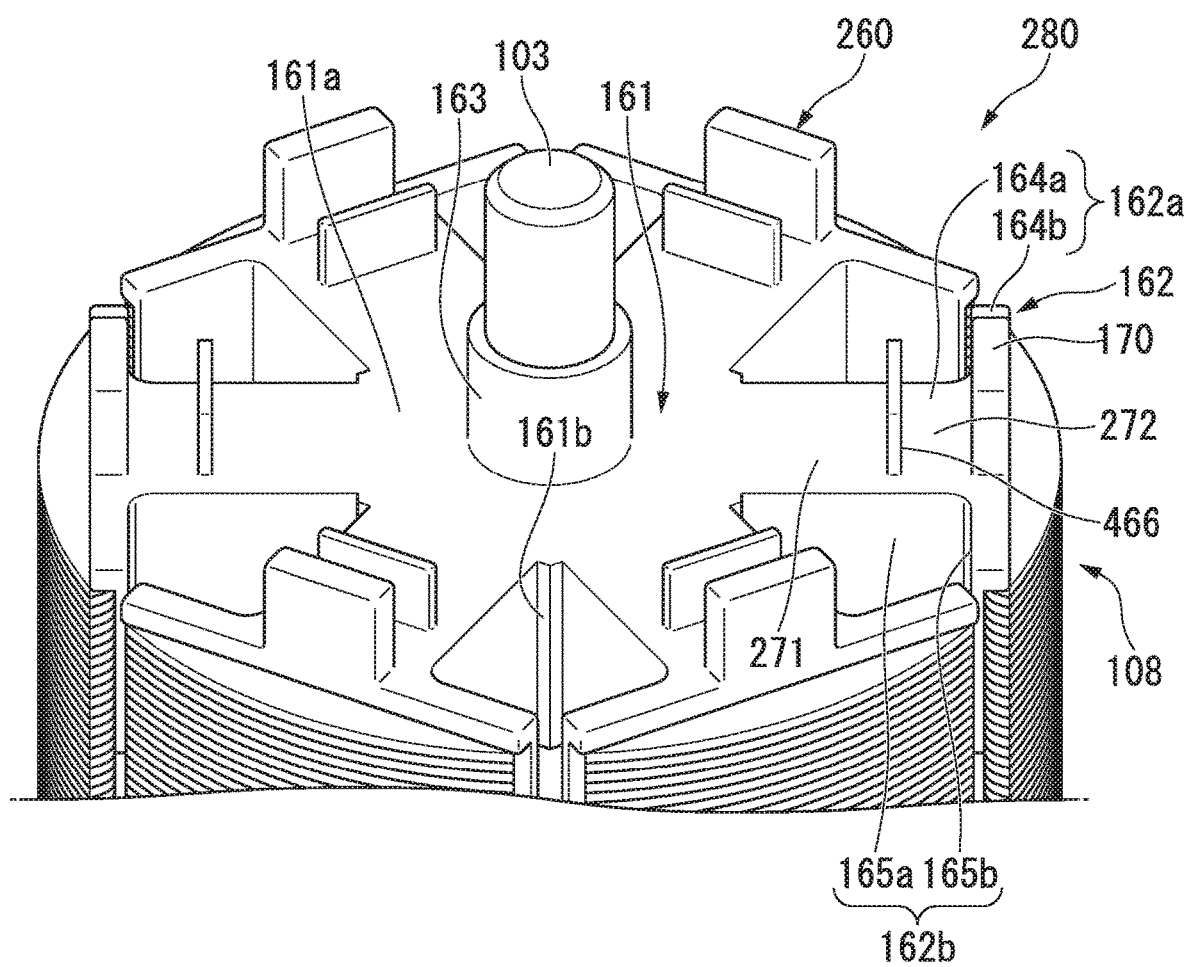
FIG. 27 is a perspective view showing a state in which an insulator is mounted on an armature core according to a third modified example of the fifth embodiment of the present invention.

FIG. 27 is a perspective view of a state in which an insulator is mounted on an armature core according to a third modified example of the fifth embodiment.

As shown in FIG. 27, the second modified example and the third modified example differ in that, in the above-mentioned second modified example, while the winding collapse prevention plate 169 is integrally formed with the connecting portion of the winding drum coating portion end surface 164a of the tooth coating portion 162 and the main body coating portion end surface 161a of the core main body coating portion 161, in the third modified example, the winding collapse prevention plate 169 is not integrally formed therewith.

Even when the above-mentioned configuration is provided, the same effect as in the second modified example of the above-mentioned fifth embodiment can be obtained.

Further, the present invention is not limited to the above-mentioned embodiments, and various modifications may be added to the above-mentioned embodiments without departing from the spirit of the present invention.

For example, the case in which the reduction motor 101 is used for driving a wiper of an automobile has been described. However, the present invention is not limited thereto but may be used as driving sources of various equipment.

In addition, in the above-mentioned embodiments, the case in which the electric motor 102 has the bottomed cylindrical yoke 105 and the armature 106 rotatably installed in the yoke 105 and the wire 114 is wound on the armature core 108 has been described. However, the present invention is not limited thereto but an electric motor may be configured of a stator and a rotor rotatably installed with respect to the stator. According to the above-mentioned configuration, the insulator is mounted on the stator core of the stator, and the wire is wound from above the insulator. The embodiment can be applied to the insulator used therein.

Further, the case in which the electric motor 102 of the above-mentioned fourth embodiment is configured of the four-pole six-slot eighteen-segment motor, and the electric motor 102 of the fifth embodiment is configured of the four-pole six-slot twelve-segment motor has been described.

However, the present invention is not limited thereto but the insulator of the embodiment can be applied to various electric motors having a structure in which the armature coil is formed of a plurality of coils. In this case, it is preferable to vary the number of partition walls according to the number of coils that constitute the armature coil. For example, when the number of coils that constitute the armature coil is 4, it is preferable to install the three partition walls at the tooth coating portion 162 to form four accommodating portions.

In addition, in the above-mentioned fourth embodiment, the case in which the flat chamfering portions 168 are formed at the corners of the partition walls 166 and 167 has been described. Further, in the above-mentioned fifth embodiment, the case in which the flat chamfering portion 268 is formed at the partition wall 266 has been described.

However, the present invention is not limited thereto but a round chamfering portion may be formed instead of the flat chamfering portion 168 or 268. Even when the round chamfering portion is formed at each of the partition walls 166, 167 and 266, a winding work of the wire 114 can be smoothly performed without the wire 114 hooking on any of the partition walls 166, 167 and 266.

Further, in the above-mentioned embodiment, the case in which each of the partition walls 166, 167, 366, 367, 266 and 466 is formed in a plate shape has been described. However, the present invention is not limited thereto but each of the partition walls 166, 167, 366, 367, 266 and 466 may be formed such that each of the coils 191, 192, 193, 291 and 292 can be disposed on the tooth coating portion 162. For example, a plurality of protrusions or the like may be formed at arbitrary positions instead of the partition walls 166, 167, 366, 367, 266 and 466.

REFERENCE SIGNS LIST

1 reduction motor
2 electric motor
3 rotation shaft
5 yoke
7 permanent magnet (magnetic pole)
8 armature core
9 armature coil (coil)
10 commutator
12 teeth
13 slot
14 wire (coil)
15 segment
16 riser
17 connecting wire
21 brush
21a low speed brush
21b high speed brush
21c common brush
91a, 91e U phase coil (coil of U phase)
92a, 93a, 92e, 93e −U phase coil (coil of −U phase)
91b, 92b, 91f, 92f −W phase coil (coil of −W phase)
93b, 93f W phase coil (coil of W phase)
91c, 91d V phase coil (coil of V phase)
92c, 93c, 92d, 93d −V phase coil (coil of −V phase)
9U1, 9U2 armature coil of U phase
9V1, 9V2 armature coil of V phase
9W1, 9W2 armature coil of W phase

The invention claimed is:
1. An electric motor comprising:
a yoke having a plurality of magnetic poles;
a rotation shaft rotatably installed inside the yoke;
an armature core having a plurality of teeth integrally formed and attached to the rotation shaft and outwardly extending in a radial direction, and a plurality of slots formed between the teeth;
a coil wound on each of the teeth through a concentrated winding method;
a commutator installed at the rotation shaft adjacent to the armature core and having a plurality of segments disposed in a circumferential direction; and
an insulator configured to cover at least peripheries of the teeth and having an insulation property, wherein at least two coils, which comprise a first coil formed by winding a wire on the teeth from above the insulator in forward through the concentrated winding method and a second coil formed by winding the wire on the teeth from above the insulator in reverse through the concentrated winding method, are provided on the teeth, wherein a partition wall configured to determine a place at which at least one of a plurality of the coils are disposed is installed at the insulator,
the partition wall is installed throughout the entire circumference of the insulator and has chamfers, the chamfers being provided at an end position of the partition wall in an axial direction of the rotation shaft and at an end position of the partition wall in the circumferential direction,
at least two accommodating portions configured to accommodate the coil are formed on the insulator by the partition wall, and
the first coil and the second coil are separately accommodated in each accommodating portion.

2. The electric motor according to claim 1, further comprising three brushes including a low speed brush and a high speed brush configured to supply power to the coil via the segments, and a common brush used in common with the low speed brush and the high speed brush, wherein
the number of magnetic poles is set to 4, the number of slots is set to 6, and the number of segments is set to 18,
the coil wound on each of the teeth comprises one of the first coil and two of the second coils,
when the teeth are allocated in the circumferential direction in sequence of a U phase, a V phase and a W phase, the first coil wound on each of the phases is provided as the coil of the U phase, the V phase and the W phase, and the second coil wound on each of the phases is provided as the coil of a −U phase, a −V phase and a −W phase,
the coils are electrically connected between the neighboring segments in the order of the U phase, the −W phase, the −W phase, the V phase, the −U phase, the −U phase, the W phase, the −V phase and the −V phase, and the coil drawn between the armature core and the commutator is drawn around the rotation shaft in the same direction.

3. The electric motor according to claim 2, wherein
in the segments, the segments having the same electric potential are connected to each other by a connecting wire,
when the coils of the U phase, the −W phase, the −W phase, the V phase, the −U phase, the −U phase, the W phase, the −V phase and the −V phase are formed, the connecting wire is formed in series along with the coils of the U phase, the −W phase, the −W phase, the V phase, the −U phase, the −U phase, the W phase, the −V phase and the −V phase,
when the connecting wire is formed, the coil is drawn in the same direction as when it is drawn between the armature core and the commutator, and
the coil is wound around a riser formed at the segment by an α turn to connect the segment and the coil.

4. The electric motor according to claim 1, further comprising two brushes configured to supply power to the coil via the segments, wherein
the number of magnetic poles is set to 4, the number of slots is set to 6, and the number of segments is set to 18,
the coil wound on each of the teeth comprises one of the first coil and two of the second coils,
when the teeth are allocated in the circumferential direction in sequence of a U phase, a V phase and a W phase, the first coil wound on each of the phases is provided as the coil of the U phase, the V phase and the W phase, and the second coil wound on each of the phases is provided as the coil of a −U phase, a −V phase and a −W phase, the coils are electrically connected between the neighboring segments in the order of the U phase, the −W phase, the −W phase, the V phase, the −U phase, the −U phase, the W phase, the −V phase and the −V phase, and the coil drawn between the armature core and the commutator is drawn around the rotation shaft in the same direction.

5. The electric motor according to claim 4, wherein in the segments, the segments having the same electric potential are connected to each other by a connecting wire, when the coils of the U phase, the −W phase, the −W phase, the V phase, the −U phase, the −U phase, the W phase, the −V phase and the −V phase are formed, the connecting wire is formed in series along with the coils of the U phase, the −W phase, the −W phase, the V phase, the −U phase, the −U phase, the W phase, the −V phase and the −V phase, when the connecting wire is formed, the coil is drawn in the same direction as when it is drawn between the armature core and the commutator, and the coil is wound around a riser formed at the segment by an α turn to connect the segment and the coil.

6. The electric motor according to claim 1, wherein the partition wall is installed such that capacities of the accommodating portions are substantially uniformized.

7. The electric motor according to claim 1, wherein protrusion heights of the partition wall are different from each other.

8. The electric motor according to claim 7, wherein the protrusion heights of the partition wall are set to be lower as the partition walls are disposed more inside in the radial direction.

9. The electric motor according to claim 1, wherein the plurality of the coils are accommodated in the accommodating portions in sequence from the accommodating portion disposed inside in the radial direction to the accommodating portion disposed outside in the radial direction.

10. An electric motor comprising:

a yoke having a plurality of magnetic poles;

a rotation shaft rotatably installed inside the yoke;

an armature core having a plurality of teeth integrally formed and attached to the rotation shaft and outwardly extending in a radial direction, and a plurality of slots formed between the teeth;

a coil wound on each of the teeth through an concentrated winding method;

a commutator installed at the rotation shaft adjacent to the armature core and having a plurality of segments disposed in a circumferential direction; and an insulator configured to cover at least peripheries of the teeth and having an insulation property, wherein the number of the segment is the number of the slots times an integral of greater than or equal to two, wherein the coil is formed by winding a wire on the teeth from above the insulator, a partition wall configured to determine a place at which at least one of a plurality of the coils are disposed is installed at the insulator the partition wall is installed throughout the entire circumference of the insulator and has chamfers, the chamfers being provided at an end position of the partition wall in an axial direction of the rotation shaft and at an end position of the partition wall in the circumferential direction, and at least two accommodating portions configured to accommodate the coil are formed on the insulator by the partition wall.

11. The electric motor according to claim 10, further comprising three brushes including a low speed brush and a high speed brush configured to supply power to the coil via the segments, and a common brush used in common with the low speed brush and the high speed brush, wherein the number of magnetic poles is set to 4, the number of slots is set to 6, and the number of segments is set to 18, the coil wound on each of the teeth comprises one first coil formed to be wound forward, and two second coils formed to be wound in reverse, when the teeth are allocated in the circumferential direction in sequence of a U phase, a V phase and a W phase, the first coil wound on each of the phases is provided as the coil of the U phase, the V phase and the W phase, and the second coil wound on each of the phases is provided as the coil of a −U phase, a −V phase and a −W phase, the coils are electrically connected between the neighboring segments in the order of the U phase, the −W phase, the −W phase, the V phase, the −U phase, the −U phase, the W phase, the −V phase and the −V phase, and the coil drawn between the armature core and the commutator is drawn around the rotation shaft in the same direction.

12. The electric motor according to claim 11, wherein in the segments, the segments having the same electric potential are connected to each other by a connecting wire, when the coils of the U phase, the −W phase, the −W phase, the V phase, the −U phase, the −U phase, the W phase, the −V phase and the −V phase are formed, the connecting wire is formed in series along with the coils of the U phase, the −W phase, the −W phase, the V phase, the −U phase, the −U phase, the W phase, the −V phase and the −V phase, when the connecting wire is formed, the coil is drawn in the same direction as when it is drawn between the armature core and the commutator, and the coil is wound around a riser formed at the segment by an α turn to connect the segment and the coil.

13. The electric motor according to claim 10, further comprising two brushes configured to supply power to the coil via the segments, wherein the number of magnetic poles is set to 4, the number of slots is set to 6, and the number of segments is set to 18, the coil wound on each of the teeth comprises one first coil formed to be wound forward, and two second coils formed to be wound in reverse, when the teeth are allocated in the circumferential direction in sequence of a U phase, a V phase and a W phase, the first coil wound on each of the phases is provided as the coil of the U phase, the V phase and the W phase, and the second coil wound on each of the phases is provided as the coil of a −U phase, a −V phase and a −W phase, the coils are electrically connected between the neighboring segments in the order of the U phase, the −W phase, the −W phase, the V phase, the −U phase, the −U phase, the W phase, the −V phase and the −V phase, and the coil drawn between the armature core and the commutator is drawn around the rotation shaft in the same direction.

14. The electric motor according to claim 13, wherein
in the segments, the segments having the same electric potential are connected to each other by a connecting wire,
when the coils of the U phase, the −W phase, the −W phase, the V phase, the −U phase, the −U phase, the W phase, the −V phase and the −V phase are formed, the connecting wire is formed in series along with the coils of the U phase, the −W phase, the −W phase, the V phase, the −U phase, the −U phase, the W phase, the −V phase and the −V phase,
when the connecting wire is formed, the coil is drawn in the same direction as when it is drawn between the armature core and the commutator, and
the coil is wound around a riser formed at the segment by an α turn to connect the segment and the coil.

15. The electric motor according to claim 10, wherein the partition wall is installed such that capacities of the accommodating portions are substantially uniformized.

16. The electric motor according to claim 10, wherein protrusion heights of the partition wall are different from each other.

17. The electric motor according to claim 16, wherein the protrusion heights of the partition wall are set to be lower as the partition walls are disposed more inside in the radial direction.

18. The electric motor according to claim 10, wherein the plurality of the coils are accommodated in the accommodating portions in sequence from the accommodating portion disposed inside in the radial direction to the accommodating portion disposed outside in the radial direction.

* * * * *